(12) United States Patent
Kherani et al.

(10) Patent No.: US 10,129,896 B2
(45) Date of Patent: Nov. 13, 2018

(54) METHOD AND SYSTEM FOR OPTIMIZING CHANNEL ACCESS IN A WIRELESS LOCAL AREA NETWORK

(71) Applicant: Samsung Electronics Co., Ltd, Gyeonggi-do (KR)

(72) Inventors: Arzad Alam Kherani, Bangalore (IN); Karthik Rangaraj Manavalan, Bangalore (IN); Amar Prakash Azad, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 15/159,713

(22) Filed: May 19, 2016

(65) Prior Publication Data

US 2017/0127424 A1    May 4, 2017

(30) Foreign Application Priority Data

May 19, 2015  (IN) .......................... 2511/CHE/2015
Nov. 4, 2015   (IN) .......................... 2511/CHE/2015

(51) Int. Cl.
*H04W 4/00*    (2018.01)
*H04L 5/14*    (2006.01)
*H04W 72/08*   (2009.01)
*H04W 74/08*   (2009.01)

(52) U.S. Cl.
CPC ....... *H04W 72/08* (2013.01); *H04W 74/0825* (2013.01)

(58) Field of Classification Search
CPC .................................................. H04W 74/0825
USPC ................ 370/276–281, 294–295, 329–330, 370/335–338, 341–345
See application file for complete search history.

(56) References Cited

U.S. PATENT DOCUMENTS

| | | | |
|---|---|---|---|
| 2002/0158801 A1* | 10/2002 | Crilly, Jr. ................ | G01S 13/74 342/378 |
| 2005/0195784 A1* | 9/2005 | Freedman ................. | H04L 1/06 370/338 |
| 2010/0008318 A1* | 1/2010 | Wentink .............. | H04W 74/006 370/329 |
| 2010/0232324 A1* | 9/2010 | Radunovic ............ | H04L 12/413 370/277 |
| 2014/0086200 A1* | 3/2014 | Seok ..................... | H04W 72/02 370/330 |

* cited by examiner

*Primary Examiner* — Thai Hoang

(57) ABSTRACT

A method and apparatus for optimizing channel access by an access point (AP) in a wireless local area network is provided, the method comprises transmitting first information to a station, and receiving second information from the station while transmitting the first information to the station, wherein the first information and the second information includes at least one of a request to send (RTS) frame, clear to send (CTS) frame, acknowledgement information, and data, respectively.

12 Claims, 35 Drawing Sheets

METHOD AND SYSTEM FOR OPTIMIZING CHANNEL ACCESS IN A WIRELESS LOCAL AREA NETWORK

CROSS-REFERENCE TO RELATED APPLICATION(S) AND CLAIM OF PRIORITY

The present application is related to and claims the benefit under 35 U.S.C. § 119(a) of an Indian provisional patent application filed on May 19, 2015 in the Indian Intellectual Property Office and assigned Serial number 2511/CHE/2015, and an Indian complete patent application filed on Nov. 4, 2015 in the Indian Intellectual Property Office and assigned Serial number 2511/CHE/2015, the entire disclosures of which are hereby incorporated by reference.

TECHNICAL FIELD

The present disclosure herein generally relates to the field of wireless communication systems. More particularly, the present disclosure relates to a mechanism for optimizing channel access in a wireless local area network (WLAN).

BACKGROUND

With the development of communication technologies, various methods for wireless communication have been used so as to overcome inconvenience of wired communication. Among those, an institute of electrical and electronic engineers (IEEE) 802.11 based wireless local area network (WLAN) has been in the limelight recently. The IEEE is a standardization organization for WLAN technologies. The IEEE 802.11 WLAN technology is increasingly popular and is becoming the dominant technology in wireless networking.

In WLAN, multiple access communication systems are used when more than two stations utilize a common medium or channel for communication with an access point (AP). There are many types of multiple access schemes and one such scheme is carrier sense multiple access (CSMA), such as CSMA with collision detection (CSMA/CD), and CSMA with collision avoidance (CSMA/CA). Generally, the CSMA scheme requires a station to use the medium to communicate in order to detect whether another station is currently using the medium. If the station detects that other station is using the medium, the station waits for the other station's communication to complete before attempting to communicate on the medium.

However, when multiple stations are waiting for other station's transmission to complete, multiple stations attempt to transmit on the medium simultaneously, upon completion of transmission. Thus leading to a collision. Due to the collision, it is possible that neither of attempts to communicate is successful. Thus, CSMA/CA has been developed as refinements of the basic CSMA concept in order to reduce the impact or avoid collisions by introducing a random amount of delay for transmission attempt over the medium.

Further, in the multiple access communication systems, transmission and reception of signals take place through a wireless medium, and a transceiver may employ an antenna for the transmission and reception. It is often desirable to use a same (i.e., common) antenna for multiple transceivers to reduce implementation area and cost. Typically reception chain (circuitry) is switched off during transmission to avoid receiving the self-transmitted signal. It may be desirable to enable a simultaneous transmission and reception (STAR) by the multiple transceivers using the same antenna. The STAR refers to transmission and reception in a same time interval. For example, assuming a scenario in which two transceivers use a same antenna, STAR means that each of the two transceivers may transmit in a same (or partially overlapping) time interval, or each of the two transceivers may receive in a same (or partially overlapping) time interval, or one of the transceivers transmits while the other receives in the same (or overlapping) time interval. Therefore, STAR allows a full duplex communication in which transmission and reception can happen simultaneously.

SUMMARY

To address the above-discussed deficiencies, it is a primary object to provide a mechanism for optimizing channel access in a WLAN.

Another aspect of the present disclosure herein is to provide a mechanism for transmitting a first data item to a station in the WLAN while receiving a second data item from the station using STAR. The first data item and the second data item is one of request to send (RTS) frame, clear to send (CTS) frame, acknowledgement (ACK) and data.

Another aspect of the present disclosure herein is to provide a mechanism from transmitting the RTS frame when an access point (AP) is in communication with a station in the WLAN. The RTS frame includes a preamble and payload data.

Another aspect of the present disclosure herein is to provide a mechanism for detecting collision of RTS frame when a preamble of RTS frame is transmitted.

Another aspect of the present disclosure herein is to provide a mechanism for backing off transmission of payload data of the RTS frame after detecting collision of the RTS frame.

Another aspect of the present disclosure herein is to provide a mechanism for aggressively transmitting the RTS frame to the AP in response to determining that the communication is successful.

In accordance with an aspect of the present disclosure, a method for optimizing channel access by an access point (AP) in a wireless local area network is provided, the method comprises transmitting first information to a station, and receiving second information from the station while transmitting the first information to the station, wherein the first information and the second information includes at least one of a request to send (RTS) frame, clear to send (CTS) frame, acknowledgement information, and data, respectively.

In accordance with another aspect of the present disclosure, an access point (AP) in a wireless local area network is provided, the AP comprises a transceiver configured to transmit and receive information, and a controller configured to control to transmit first information to a station, and to receive second information from the station while transmitting the first information to the station, wherein the first information and the second information includes at least one of a request to send (RTS) frame, clear to send (CTS) frame, acknowledgement information, and data, respectively.

In accordance with still another aspect of the present disclosure, a method for optimizing channel access by a station in a wireless local area network is provided, the method comprises receiving first information from an access point (AP), and transmitting second information to the AP while receiving the first information from the AP, wherein the first information and the second information includes at least one of a request to send (RTS) frame, clear to send (CTS) frame, acknowledgement information, and data, respectively.

In accordance with still another aspect of the present disclosure, a station in a wireless local area network is provided, the station comprises a transceiver configured to transmit and receive information, and a controller configured to control to receive first information from an access point (AP), and to transmit second information to the AP while receiving the first information from the AP, wherein the first information and the second information includes at least one of a request to send (RTS) frame, clear to send (CTS) frame, acknowledgement information, and data, respectively.

In accordance with still another aspect of the present disclosure, a method for optimizing channel access in a wireless local area network (WLAN) is provided. The method includes transmitting, by an access point (AP), a first data item to a station while receiving a second data item from the station. The AP is in simultaneous transmission and reception (STAR) mode.

In accordance with still another aspect of the present disclosure, a method for optimizing channel access in a WLAN is provided. The method includes transmitting, by a station, a first data item to an AP while receiving a second data item from the AP. The station is in STAR mode.

In accordance with still another aspect of the present disclosure, a method for optimizing channel access in a WLAN is provided. The method includes transmitting, by a first station, a request to Send (RTS) frame to an AP when the AP is in communication with a second station. The RTS frame includes a preamble and payload data. Further, the method includes detecting, by the first station, a collision of the RTS frame when the preamble of the RTS frame is transmitted. The method includes backing off, by the first station, the transmission of the payload data of the RTS frame. The method includes determining, by the first station, whether the communication between the second station and the AP is successful. Furthermore, the method includes aggressively transmitting, by the first station, the RTS frame in response to determining that the communication is successful.

In accordance with still another aspect of the present disclosure, an AP for optimizing channel in a WLAN is provided. The AP includes a controller unit configured to transmit a first data item to a station while receiving a second data item from the station. The AP is in STAR mode.

In accordance with still another aspect of the present disclosure, a station for optimizing channel access in a WLAN is provided. The station includes a controller unit configured to transmit a first data item to an AP while receiving a second data item from the AP. The station is in STAR mode.

In accordance with still another aspect of the present disclosure, a system for optimizing channel access in a WLAN is provided. The system includes an access point and a second station. The access point is configured for transmitting a first data item to a first station while receiving a second data item from the first station. The AP is in STAR mode. The second station is configured to transmit a RTS frame, to the AP when the AP is in communication with the first station. The RTS includes a preamble and payload data. The second station is configured to detect a collision of the RTS frame when the preamble of the RTS is transmitted. The second station is configured to back off transmission of payload data of RTS frame. Further, the second station is configured to determine whether the communication between the first station and the AP is successful. Further, the second station is configured to aggressively transmit the RTS frame in response to determining that the communication is successful.

In accordance with still another aspect of the present disclosure, a computer program product is provided. The computer program product comprising computer executable program code recorded on a computer readable non-transitory storage medium, the computer executable program code when executed causing the actions including transmitting, a first data item, to a station while receiving a second data item from the station. The AP is in STAR mode.

In accordance with still another aspect of the present disclosure, a computer program product is provided. The computer program product comprising computer executable program code recorded on a computer readable non-transitory storage medium, the computer executable program code when executed causing the actions including transmitting a first data item to an AP while receiving a second data item from the AP. The station is in STAR mode.

In accordance with still another aspect of the present disclosure, a computer program product is provided. The computer program product comprising computer executable program code recorded on a computer readable non-transitory storage medium, the computer executable program code when executed causing the actions including transmitting, a RTS frame, to an AP when the AP is in communication with a second station. The RTS includes a preamble and payload data. The computer executable program code when executed causing the further actions including detecting a collision of the RTS when the preamble of the RTS is transmitted. The computer executable program code when executed causing the further actions including backing off transmission of the payload data of the RTS frame. The computer executable program code when executed causing the further actions including determining whether the communication between the first station and the AP is successful. The computer executable program code when executed causing the further actions including aggressively transmitting the RTS in response to determining that the communication is successful.

Other aspects, advantages, and salient features of the invention will become apparent to those skilled in the art from the following detailed description, which, taken in conjunction with the annexed drawings, discloses exemplary embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1:
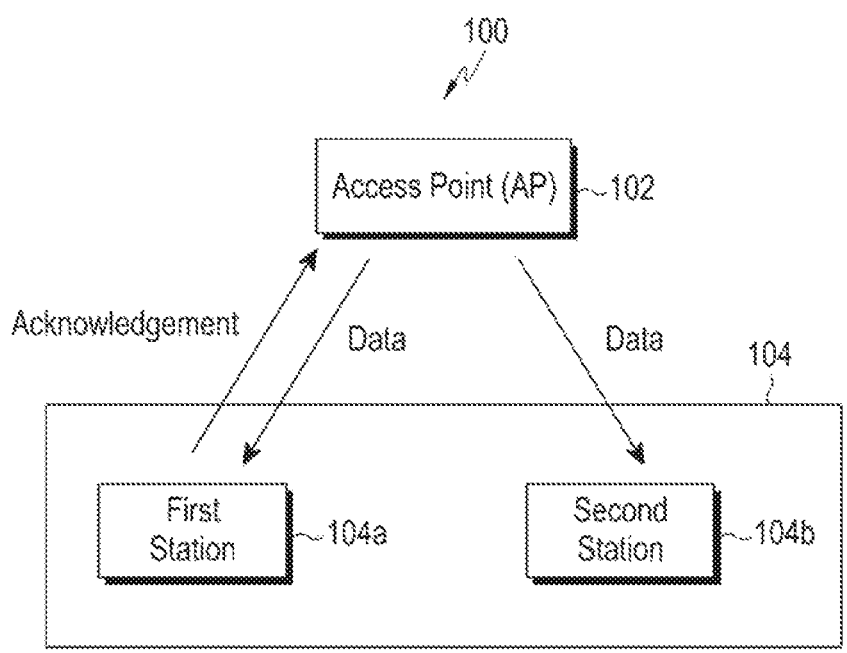
FIG. 1 illustrates a block diagram of a system for optimizing channel access in a wireless local area network (WLAN), according to an exemplary embodiment of the present disclosure.

The drawings described herein are for illustration purposes only and are not intended to limit the scope of the present disclosure in any way.

DETAILED DESCRIPTION

FIGS. 1 through 16B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The present disclosure herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the present disclosure herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the present disclosure herein can be practiced and to further enable those skilled in the art to practice the present disclosure herein. Accordingly, the examples should not be construed as limiting the scope of the present disclosure herein.

Prior to describing the present disclosure in detail, it is useful to provide details related to wireless networking systems for better understanding of the present disclosure provided in this disclosure.

A basic access mechanism of the IEEE 802.11 medium access control (MAC) is a carrier sense multiple access with collision avoidance (CSMA/CA) combined with binary exponential back off. The CSMA/CA mechanism is also referred to as a distributed coordinate function (DCF) of the IEEE 802.11 MAC, and basically employs a "listen before talk" access mechanism. In this type of access mechanism, a station listens to a wireless channel or medium before starting transmission. The station is also called a node, a device, a terminal, a user station, a user equipment, or a mobile station, etc. As a result of listening, if it is sensed that the medium is not in use, a listening station starts its transmission. Otherwise, if it is sensed that the medium is in use, the station does not start its transmission, but enters a delay duration determined by the binary exponential back off.

The CSMA/CA mechanism also includes virtual carrier sensing in addition to physical carrier sensing in which the station directly listens the medium. The virtual carrier sensing is designed to compensate for a limitation in the physical carrier sensing such as a hidden node problem. For the virtual carrier sensing, the IEEE 802.11 MAC uses a network allocation vector (NAV). The NAV is a value transmitted by a station, currently using the medium or having a right to use the medium, to another station to indicate a remaining time before the medium returns to an available state. Therefore, a value set to the NAV corresponds to a duration reserved for the use of the medium by the station transmitting a corresponding frame.

A MAC layer frame headers contain a duration field that specifies the transmission time required for the frame, in which time the medium will be busy. The stations listening on the wireless medium read the duration field and set their NAV, which is an indicator for a station on how long it defers from accessing the medium.

One of the procedures for setting the NAV is an exchange procedure of a request to send (RTS) frame and a clear to send (CTS) frame. The RTS frame and the CTS frame include information capable of delaying transmission of frames from receiving stations by reporting upcoming frame transmission to the receiving stations. The information may be included in a duration filed of the RTS frame and the CTS frame. After performing the exchange of the RTS frame and the CTS frame, a source station transmits a to-be-transmitted frame to a destination station.

A successful exchange of RTS and CTS frames attempts to reserve the channel for the time duration needed to transfer the data frame under consideration. The present disclosure described in this disclosure uses the RTS/CTS method of CSMA, which can be best described as CSMA/CA.

In RTC/CTS protocol, a station senses the state of a channel before initiating a transmission to determine if another station is transmitting. The station proceeds with its transmission if the medium is determined to be idle for an interval that exceeds the distributed inter frame space (DIFS). If the medium is busy, then the back off rules apply, which are as follows: the node defers until after a DIFS is detected, and then generates a random back off period for an additional deferral time before transmitting. This minimizes collisions during contention between multiple nodes. The back off period is used to initialize a back off timer. The back off timer is decremented only when the medium is idle. The back off timer is frozen when the medium is busy. After a busy period, the decrementing of the back off timer resumes only after the medium has been free longer than a DIFS. A contention window (CW) is a station state variable and it initially takes a value $CW_{min}$. The back off period is chosen as (random (0, 1) CW×SLOT), where SLOT is the time slot size. Thus, on an average it is expected to be CW×SLOT/2. A station initiates a transmission when the back off timer reaches zero.

When a transmitter (station or access point) initiates a transmission, the transmitter sends RTS frame after the channel has been idle for a time interval exceeding DIFS. On receiving an RTS frame, the receiver (station) responds with a CTS frame (the CTS frame acknowledges the successful reception of the RTS frame), which can be transmitted after the channel has been idle for a time interval exceeding a short inter frame space (SIFS) whose value is less than DIFS. After the successful exchange of RTS and CTS frames, the data frame (DATA) can be sent by the transmitter after waiting for an additional time interval SIFS. The receiver confirms the success of data transmission with a positive acknowledgment (ACK) message back to the transmitter. At the transmitter, if either a CTS frame is not received within a predetermined time interval (CTS timeout) or if an ACK message is not received within a predetermined time interval (ACK timeout), then three things happen: (i) the station doubles its maximum CW; (ii) the station perform the back off rules alone and (iii) the station will initiate the next RTS attempt, i.e., the RTS is retransmitted.

The SLOT, $CW_{min}$, SIFS, DIFS, and the length of various control frames (RTS, CTS, and ACK) are all model constants and are based on clear channel assessment time, receive (Rx)-transmit (Tx) turnaround time, and air propagation time. The size of DATA depends on the traffic that is being transmitted. The MaxRetry, CTS timeout and ACK timeout are model variables that can be tuned or adapted.

It may be noted that the RTS and CTS frames contain a duration field that indicates the period the channel is to be reserved for transmission of the actual data frame. This information is used by stations (nodes) that can hear either the transmitter and/or the receiver to update their NAV, a timer that is always decreasing if its value is non-zero. A station is not allowed to initiate a transmission if its NAV is non-zero. Since nodes that can hear either the transmitter or the receiver resist from transmitting during the transmission of the data frame, the probability of its success is increased.

Accordingly the present disclosure herein achieves an apparatus and method for optimizing channel access in a WLAN. The method includes transmitting, by an AP (or a base station or a node), a first data (item) to a station while receiving a second data (item) from the station. The AP is in a simultaneous transmission and reception (STAR) mode. Similarly, the method includes transmitting, by the station, a first data (item) to the AP while receiving a second data (item) from the AP. The station is in the STAR mode. The data item may be also called data simply.

Accordingly the present disclosure herein provides a system and method for optimizing channel access in a WLAN. The method includes transmitting a RTS frame to an AP when the AP is in communication with a second station. The RTS frame includes a preamble and payload data. The method includes detecting a collision of the RTS frame when the preamble of the RTS frame is transmitted. The method includes backing off the transmission of the payload data of the RTS frame. The method includes determining whether the communication between the second station and the AP is successful. Furthermore, the method includes aggressively transmitting the RTS frame in response to determining that the communication is successful.

In an embodiment, the first data item is one of RTS frame, Acknowledgement, and data.

In an embodiment, the second data item is one of RTS frame, Acknowledgement, and data.

Unlike the conventional systems and method, the STAR based medium access for IEEE 802.11 is achieved. For example:

Simultaneous transmit and receive in is enabled by STAR.
  A node (station/AP) can transmit and receive simultaneously (Can receive from one node).
  Enables collision detection (CD): enables early back off on CD.
Full duplex transmission (STA/AP transmit and receive DATA concurrently).
  Enabled by RTS/CTS mechanism that reserves the NAV
    Need not to have station/AP both do RTS/CTS: can be mixed
  Stations back off on CD while AP always never back off and continues transmission.
    MODE M (Mixed): AP uses RTS/CTS for transmission while STA can directly transmit DATA.
    MODE R (RTS/CTS): both AP and station uses RTS/CTS for packet transmission.

The proposed system and method can be used to optimize channel access in WLAN by enabling the AP and the stations with STAR. The use of STAR in the WLAN reduces the NAV duration. For example, instead of waiting for the acknowledgement from the station, the AP can now simultaneously transmit the RTS/data while receiving the ACK from the station. Similarly, the station can receive the RTS from the AP while acknowledging. Similarly, the station can decode the RTS/data while acknowledging as the RTS. Thus, such parallelizing ACK and RTS/data transmissions improves the channel usage time, system data throughput, current consumption, and delay performance. The current consumption performance improves because the station and AP do not have to spend extra RF warm-up time (e.g., a number of events requiring switching ON/OFF of RF reduce).

Further, the proposed system and method can be used to detect early CSMA/CD in order to avoid collision of RTS. Thus, saving energy and improvising overall system performance. For example, the station detects early collision of RTS frame when preamble of the RTS frame is transmitted to the AP when the AP is in communication with another station in the WLAN. When the early collision is detected, the station backs off the transmission of payload data of the RTS frame. Unlike the conventional system and method, the station detects collision early when the preamble of the RTS frame is collided and backs off early without transmitting the payload data of the RTS frame. Thus, the station backs off early by detecting the collision of preamble of its RTS frame transmitted to the AP. When the station determines a successful transmission between the AP and another station (e.g., since the station is in STAR mode, the station can determine whether the transmission between the AP and another station is successful), the station can aggressively transmit RTS frame to the AP and there can be higher probability of receiving data from the AP after determining that the communication is successful.

Referring now to the drawings, and more particularly to FIGS. 1 through 15, where similar reference characters denote corresponding features consistently throughout the figures, there are shown preferred embodiments.

FIG. 1 illustrates a block diagram of a system 100 for optimizing channel access in a wireless local area network (WLAN), according to an exemplary embodiment of the present disclosure.

Referring to FIG. 1, in an embodiment, the system 100 includes an access point (AP) 102 and station 104. The station 104 includes a first station 104a, and a second station 104b. Though, the system 100 in the FIG. 1 includes the first station 104a and the station 104b, it may be understood that the system 100 may include a plurality of stations 104a to 104n and many other components which are not shown in the FIG. 1.

The AP 102 communicates with the first station 104a and the second station 104b. The following description will be made in a case where the AP 102 communicates with a plurality of stations (104a-104n) (where n≥2). It is apparent that the present invention can also be applied to a case where the AP 102 transmits data to one station.

The AP 102 may have two or more antennas, and each of the stations 104a-104n (where n≥2) may have one or more antennas. The AP 102 has antennas, the number which is equal to or greater than the total number of antennas of the plurality of stations 104a-104n (where n≥2) communicating with the AP 102. The AP 102 can transmit and receive simultaneously to and from the plurality of stations 104a to 104n (not depicted) with simultaneous transmission and reception (STAR). Thus, it may be noted that the AP 102 is in STAR mode for communicating with the plurality of stations 104a to 104n.

The first station 104a and the second station 104b are capable of transmitting and receiving simultaneously from the AP 102 with STAR.

In an embodiment, the AP 102 transmits the first data item to the first station 102a. The first data item transmitted to the first station 102a is the RTS frame. The AP 102 receives a clear to send (CTS) frame from the first station 102a. The AP 102 transmits data to the first station 102a. In response to the data sent to the first station 102a, the AP 102 receives the second data item from the first station. The second data item received from the first station is ACK.

In an embodiment, the AP 102 transmits the first data item (RTS frame) to the second station 104b while receiving the second data item (ACK) from the first station 104a.

The first station 104a transmits the first data item to the AP 102 after receiving data from the AP 102. The first data item transmitted by the first station 104a is the ACK. The first station 104a receives a first data item from the AP 102 while transmitting the ACK to the AP 102. The first data item received from the AP 102 is the ACK. The first station 104a can simultaneously transmit the ACK while receiving the RTS frame from the AP 102 using STAR.

When the AP 102, the first station 104a and the second station 104b are enabled with STAR mode, NAV duration is reduced. The use of STAR in the WLAN reduces the NAV duration. For example, instead of waiting for the acknowledgement from the station, the AP can now simultaneously transmit the RTS/data while receiving the ACK from the station. Similarly, the station can receive the RTS from the AP while acknowledging. Similarly, the station can decode the RTS/data while acknowledging as the RTS. Thus, such parallelizing ACK and RTS/data transmissions improves the channel usage time, system data throughput, current consumption, and delay performance. The current consumption performance improves because the station and AP do not have to spend extra RF warm-up time (e.g., a number of events requiring switching ON/OFF of RF reduce).

The various embodiments related to transmitting the first data item by the AP 102 and receiving the second data item while transmitting the first data item with STAR is explained in conjunction with figures in the later parts of the description.

Figure 2:
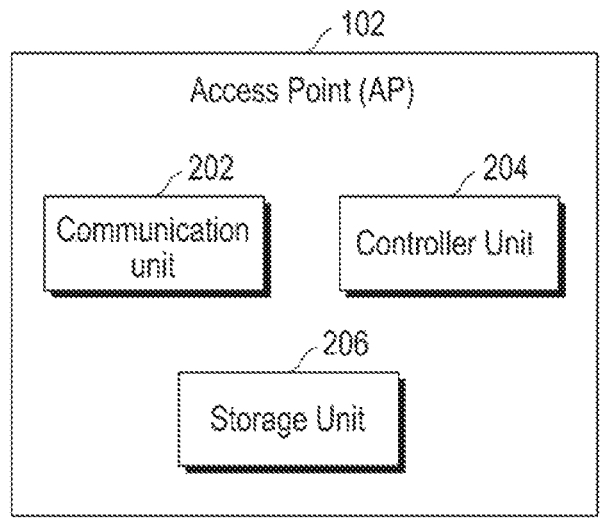
FIG. 2 illustrates various units of an access point (AP), according to an exemplary embodiment of the present disclosure.

FIG. 2 illustrates various units of an access point (AP), for optimizing channel access in the WLAN, according to an exemplary embodiment of the present disclosure.

Referring to FIG. 2, in an embodiment, the AP 102 includes a communication unit 202, a controller unit 204, and a storage unit 206.

The communication unit 202 can be configured for communicating internally between the units and with one or more stations. Further, the communication unit 202 acts as an interface for transmitting or receiving the first data item or the second data item from one or more stations 104.

The controller unit 204 can be configured for performing one or more actions to optimize channel access by the AP 102. The controller unit 204 can be configured for transmitting the first data item to the first station 104a while receiving the second data item from the first station 104a. In an embodiment, the controller unit 204 can be configured for transmitting the first data item to one or more stations (104a-104c) while receiving the second data item from the one or more stations (104a-104c).

The storage unit 206 stores the first data item or the second data item received from the one or more stations 104. The storage unit 708 may include one or more computer-readable storage media. The storage unit 206 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 206 may, in some examples, be considered a non-transitory storage medium. The term "non-transitory" may indicate that the storage medium is not embodied in a carrier wave or a propagated signal. However, the term "non-transitory" may not be interpreted that the storage unit 206 is non-movable. In some examples, the storage unit 206 can be configured to store larger amounts of information than the memory. In certain examples, a non-transitory storage medium may store data that can, over time, change (e.g., in random access memory (RAM) or cache).

Figure 3:
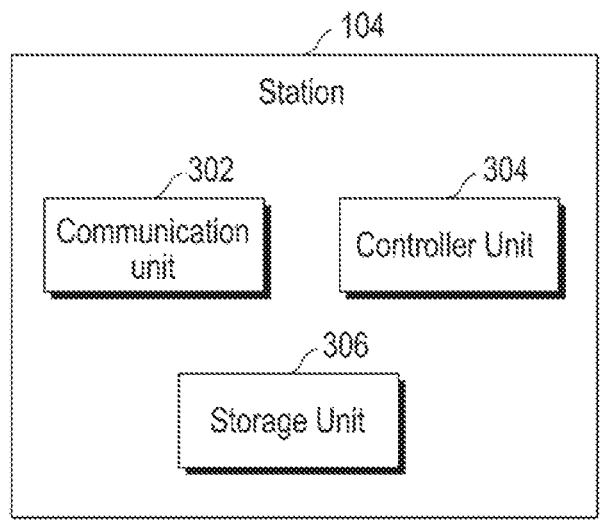
FIG. 3 illustrates various units of a station, according to an exemplary embodiment of the present disclosure.

FIG. 3 illustrates various units of the station for optimizing channel access in the WLAN, according to an exemplary embodiment of the present disclosure.

Referring to FIG. 3, in an embodiment, the station 104 includes a communication unit 302, a controller unit 304, and a storage unit 306.

The communication unit 302 can be configured for communicating internally between the units and with one or more stations (104a-104c). Further, the communication unit 302 acts as an interface for transmitting or receiving the first data item or the second data item from the AP 102.

The controller unit 304 can be configured for performing one or more actions to optimize channel access by the station. The controller unit 304 can be configured for transmitting a first data item to the AP 102 while receiving a second data item from the AP 102. In an embodiment, the controller unit 304 can be configured for transmitting a request to a RTS frame to an AP 102 when the AP 102 is in communication with another station. In addition, the controller unit 304 can be configured for detecting a collision of the RTS frame when the preamble of the RTS frame is transmitted. Furthermore, the controller unit 304 can be configured for backing off the transmission of the payload data of the RTS frame. The controller unit 304 can be also configured for determining whether the communication between another station and the AP is successful. In addition, the controller unit 304 can be also configured for aggressively transmitting the RTS frame in response to determining that the communication is successful.

The storage unit 306 stores the first data item or the second data item received from the one or more stations. The storage unit 306 may include one or more computer-readable storage media. The storage unit 306 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 306 may, in some examples, be considered a non-transitory storage medium. The term "non-transitory" may indicate that the storage medium is not embodied in a carrier wave or a propagated signal. However, the term "non-transitory" may not be interpreted that the storage unit 306 is non-movable. In some examples, the storage unit 306 can be configured to store larger amounts of information than the memory. In certain examples, a non-transitory storage medium may store data that can, over time, change (e.g., in random access memory (RAM) or cache).

Figure 4:
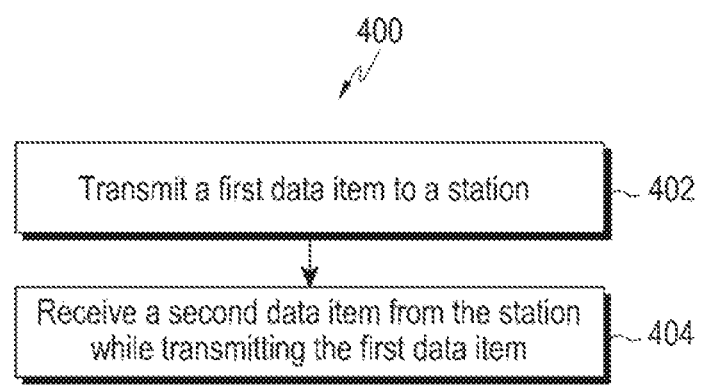
FIG. 4 is a flow chart illustrating a method for optimizing channel access in the WLAN, according to an exemplary embodiment of the present disclosure.

FIG. 4 is a flow chart illustrating a method 400 for optimizing channel access in the WLAN, according to an exemplary embodiment of the present disclosure. The method 400 can be performed by the AP 102 or the station 104.

Figures 16A, 16B:
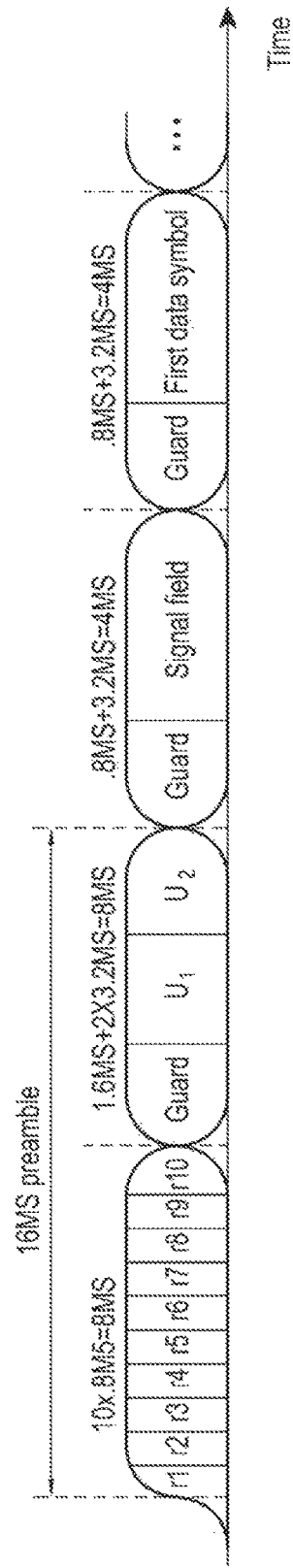
FIGS. 16A and 16B illustrate an example of RTS frame, according to an exemplary embodiment of the present disclosure.

Referring to FIG. 4, at step 402, the method 400 includes transmitting the first data item to the station. The method 400 allows the controller unit 204 to transmit the first data item to the station. The first data item includes at least one of RTS frame, ACK, and data. In an embodiment, the RTS frame includes short training fields (STF), long training fields (LTF) and payload data. An example RTS frame is shown in FIGS. 16A and 16B.

At step 404, the method 400 includes receiving the second data item from the station while transmitting the first data item. The method allows the AP or the station to receive the second data item while transmitting the first data item. The second data item includes at least one of RTS frame, ACK, and data.

Unlike the conventional method, the proposed method 400 allows transmission of the first data item to the station by the AP while receiving the second data item from the station with STAR. In an embodiment, the AP transmits the RTS to the station while receiving ACK (e.g., in response to data) from the station as the AP is in STAR mode. Further, the various actions, acts, blocks, steps, or the like in the method 400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
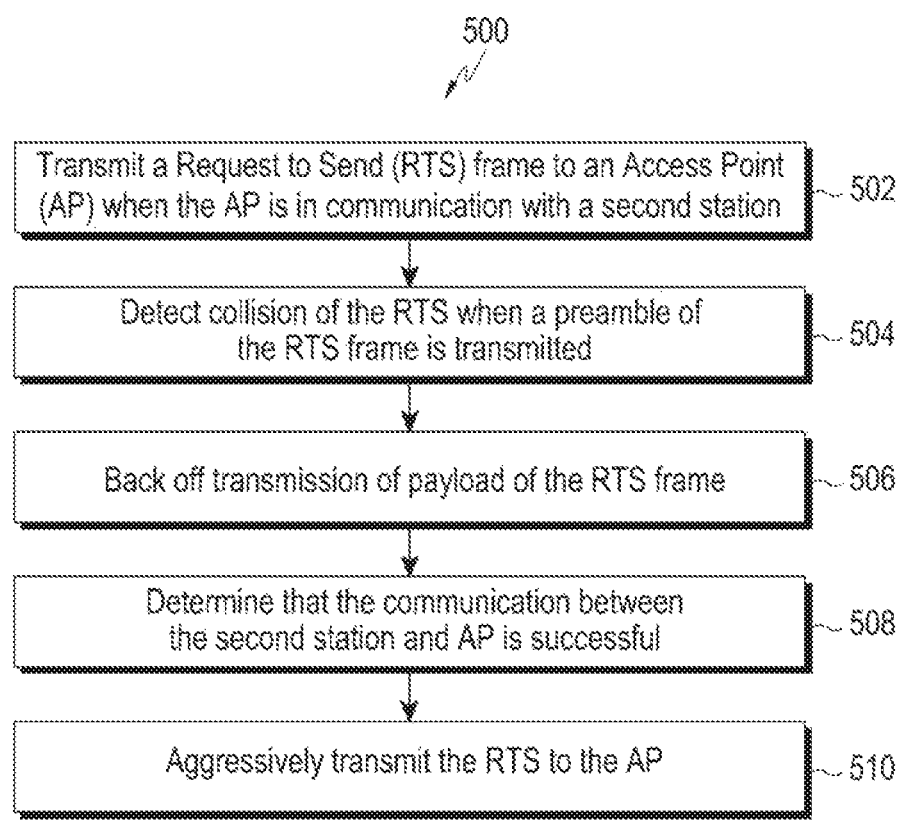
FIG. 5 is a flow chart illustrating a method for detecting a collision and backing off transmission by a station in the WLAN, according to an exemplary embodiment of the present disclosure.

FIG. 5 is a flow chart illustrating a method for detecting a collision and backing off transmission by a station in the WLAN, according to an exemplary embodiment of the present disclosure.

Referring to FIG. 5, in an embodiment, at step 502, the method 500 includes transmitting the RTS frame to the AP 102 when the AP 102 is in communication with the second station 104b. The method 500 allows the controller unit 304 of the (first) station to transmit the RTS frame to the AP 102 when the AP 102 is in communication with the second station 104b.

At step 504, the method 500 includes detecting collision of the RTS when a preamble of the RTS is transmitted. The method 500 allows the controller unit 304 to detect collision of the RTS when the preamble of the RTS is transmitted.

At step 506, the method 500 includes backing off transmission of payload of the RTS frame. The method 500 allows the controller unit 304 to back off transmission of payload of the RTS frame.

At step 508, the method 500 includes determining that that communication between the AP 102 and the second station 104b is successful. The method 500 allows the controller unit 304 to determine that the communication between the AP 102 and the second station 104b is successful.

At step 510, the method 500 includes aggressively transmitting the RTS frame to the AP 102. The method 500 allows the controller unit 304 to aggressively transmit the RTS frame to the AP 102.

Unlike the conventional method, the proposed method 500 allows the station 104 to detect collision of RTS frame when preamble of the RTS frame is transmitted to the AP when the AP is in communication with another station in the WLAN. The station detects the collision of preamble of the RTS frame and backs off transmission of payload data of the RTS frame. The station detects collision early when the preamble of the RTS frame is collided and backs off early without transmitting the payload data of the RTS frame. Thus, the station backs off early by detecting the collision of preamble of its RTS frame transmitted to the AP.

Further, the various actions, acts, blocks, steps, or the like in the method 500 may be performed in the order presented, in a different order or simultaneously. Further, in some embodiments, some of the actions, acts, blocks, steps, or the like may be omitted, added, modified, skipped, or the like without departing from the scope of the invention.

Figure 6:
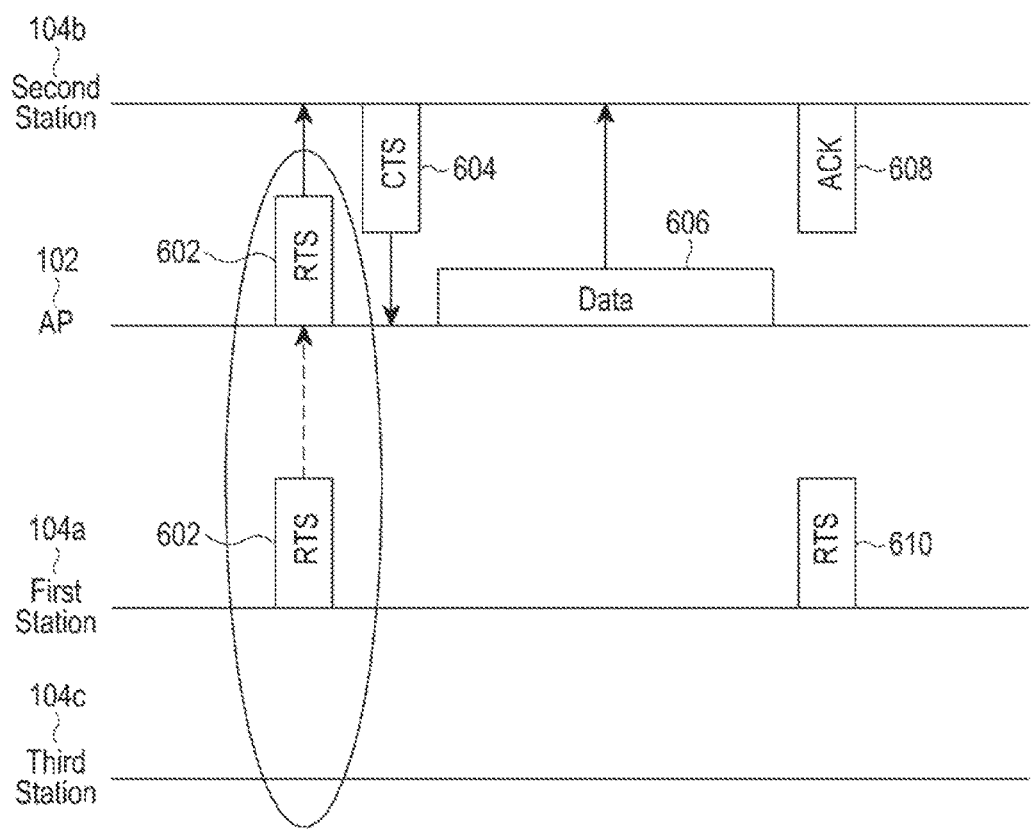
FIG. 6 illustrates a sequence diagram in which a station detects a collision of RTS frame and backs off transmission of RTS frame, according to an exemplary embodiment of the present disclosure.

FIG. 6 illustrates a sequence diagram in which a station detects a collision of RTS frame and backs off transmission of RTS frame, according to an exemplary embodiment of the present disclosure.

Referring to FIG. 6, in an embodiment, the AP 102 sends (602) the RTS frame to the second station 104b. The first station 104a also sends (602) the RTS frame to the AP 102. The AP 102 receives (604) CTS frame from the second station 104b in response to the RTS frame sent to the second station 104b. The AP 102 sends (606) data to the second station 104b after receiving the CTS frame from the second station 104b.

The first station 104a detects collision of RTS frame when preamble of RTS frame is transmitted. After detecting the collision of the RTS frame, the first station 104a backs off transmission of payload data of the RTS frame. In an embodiment, the first station 104a backs off after transmitting the preamble of the RTS frame, which includes STF and LTF.

With STAR, the first station 104a can determine transmission of data between the AP 102 and the second station 104b. When the first station 104a determines that the data transmission between the AP 102 and the second station 104b is successful, the first station 104a aggressively transmits (610) the RTS frame to the AP 102.

The first station 104a detects that the RTS attempt had collided, and determines that there are higher chances of success (as the contending station (first station 104a) has successfully transmitted). Thus, the first station 104a attempts aggressive transmission of RTS frame to the AP 102.

In case, when the channel of AP 102 and the first station 104a is not allowing data transfer, aggressive transmission of the RTS frame by the first station 104a can benefit the first station 104a for receiving the data from the AP 102.

Figure 7:
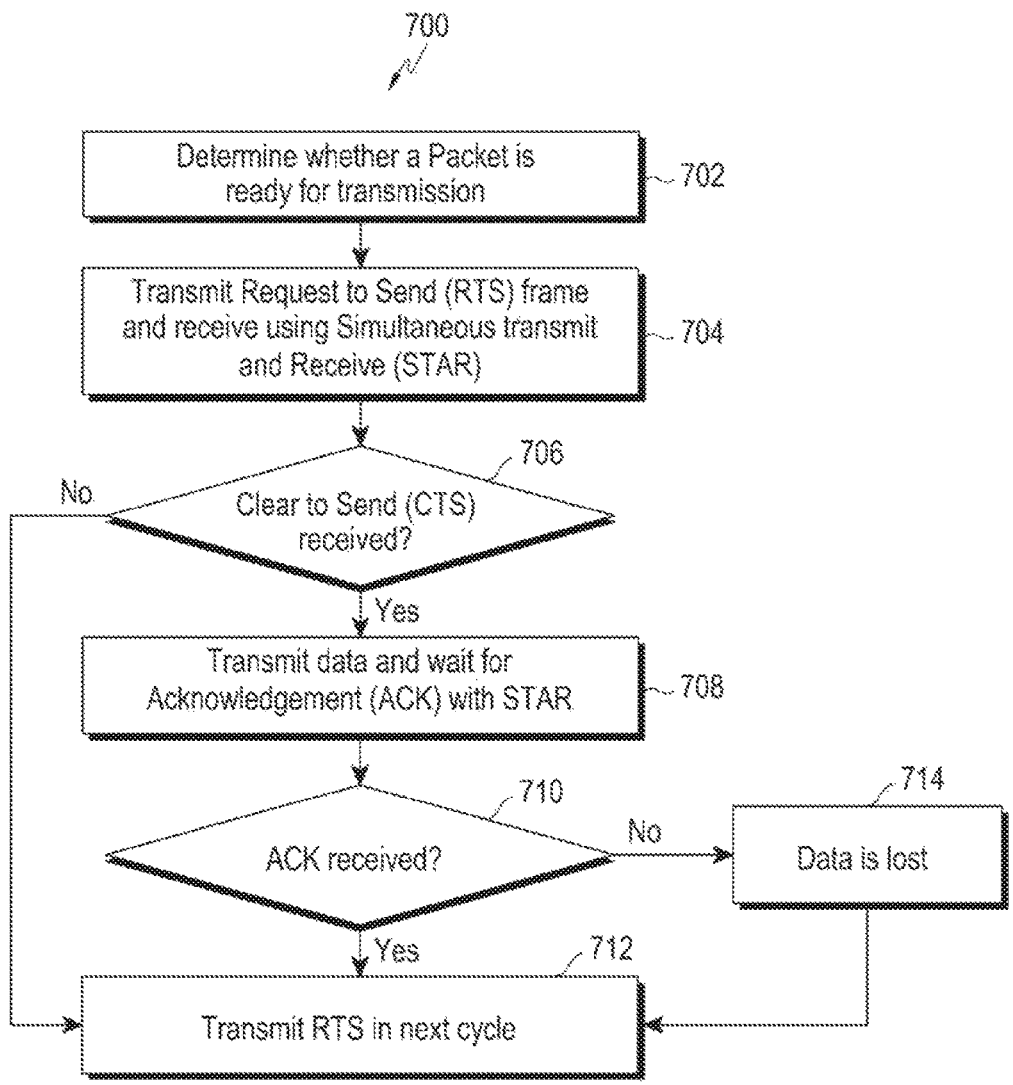
FIG. 7 is a flow diagram illustrating a method for achieving multiple transmissions and receptions by an AP in the WLAN, according to an exemplary embodiment of the present disclosure.

FIG. 7 is a flow diagram illustrating a method 700 for achieving multiple transmissions and receptions by an AP in the WLAN, according to an exemplary embodiment of the present disclosure.

Referring to FIG. 7, at step 702, the method 700 includes determining whether a packet is ready for transmission. The method 700 allows the controller unit 204 to determine whether the packet is ready for transmission.

At step 704, the method 700 includes transmitting the RTS frame to the first station 104a. The method 700 allows the controller unit 204 of the AP to transmit the RTS frame to the first station 104a. At step 706, the method 700 includes determining whether the CTS frame is received from the first station 104a. The method 700 allows the controller unit 204 to determine whether the CTS frame is received from the first station 104a.

At step 706, if it is determined that the CTS frame is received then, at step 708, the method 700 includes transmitting the data to the first station 104a and waiting for the ACK from the first station 104a. The method 700 allows the controller unit 204 to transmit the data to the first station 104a and wait for the ACK from the first station 104a.

If it is determined, at step 706, that the CTS frame is not received, at step 712, the method includes transmitting the RTS frame to the first station 104a in next cycle. The method 700 allows the controller unit 204 to transmit the RTS frame to the first station 104a in next cycle.

At step 710, the method 700 includes determining whether the ACK is received from the first station 104a. The method 700 allows the controller unit 204 to determine whether the ACK is received from the first station 104a.

If it is determined, at step 710, that the ACK is received from the first station 104a then, at step 712, the method 700 includes transmitting the RTS frame to the first station 104a in next cycle. The method 700 allows the controller unit 204 to transmit the RTS frame to the first station 104a in next cycle.

If it is determined, at step 710, that the ACK is received from the first station 104a then, at step 714, the method 700 includes detecting that the data is lost. The method 700 allows the controller unit 204 to detect that the data is lost.

The various actions, acts, blocks, steps, or the like in the method 700 may be performed in the order presented, in a different order or simultaneously. Further, in some embodiments, some of the actions, acts, blocks, steps, or the like may be omitted, added, modified, skipped, or the like without departing from the scope of the invention.

Figure 8:
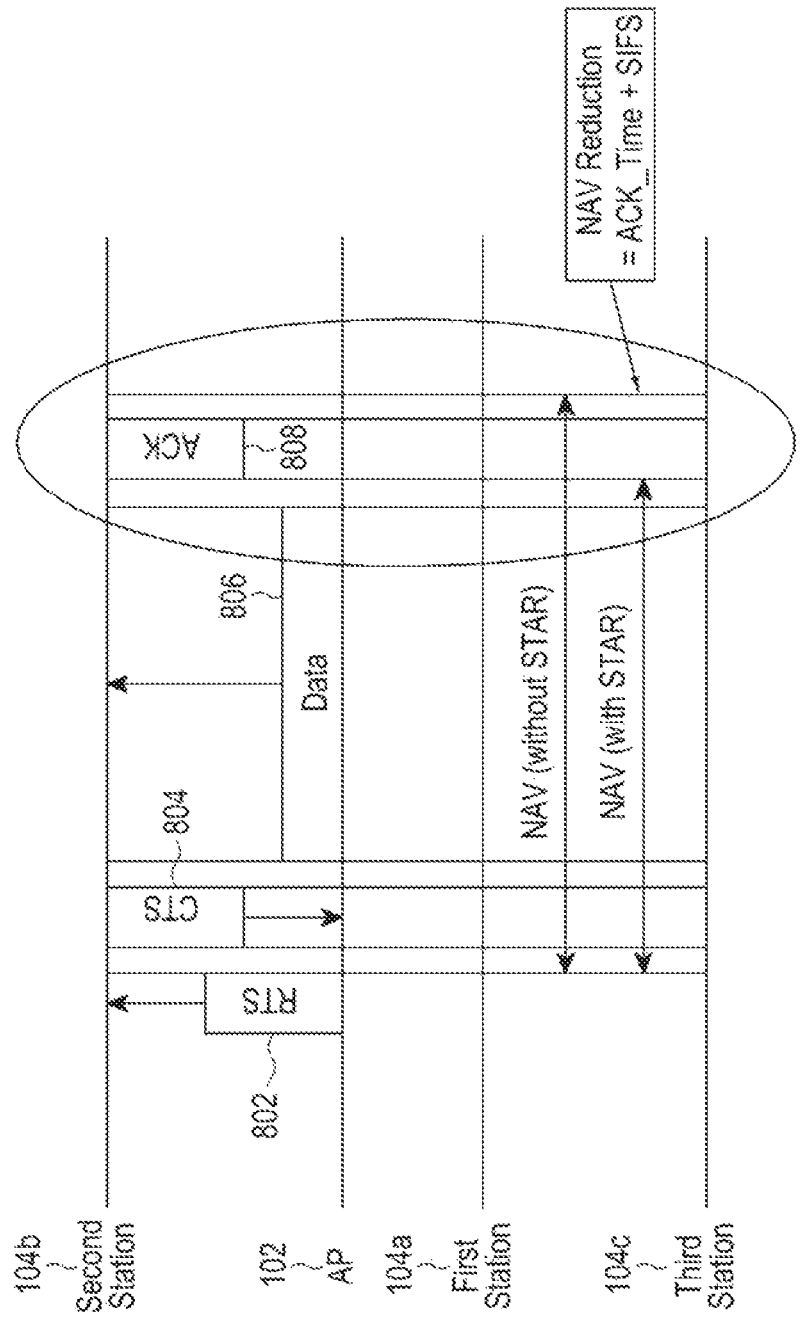
FIG. 8 illustrates a sequence diagram in which a network allocation vector (NAV) is reduced using STAR, according to an exemplary embodiment of the present disclosure.

FIG. 8 illustrates a sequence diagram in which the NAV is reduced using STAR, according to an exemplary embodiment of the present disclosure.

Referring to FIG. 8, as depicted in the sequence diagram, initially, the AP 102 sends (802) the RTS frame to the second station 104b.

The AP 102 receives (804) CTS frame from the second station 104b in response to the RTS frame sent to the second station 104b. Further, the AP 102 sends (806) data to the second station 104b after receiving the CTS frame from the second station 104b. The AP 102 receives (808) ACK from the second station 104b in response to the data sent to the second station 104b.

As depicted in the FIG. 8, with STAR, the NAV is reduced. The amount of NAV reduction is equal to addition of ACK_Time and SIFS. With reduction in the NAV, the channel usage time will be improved. For example, instead of waiting for the acknowledgement from the station 104, the AP 102 can now simultaneously transmit the RTS/data while receiving the ACK from the station. Similarly, the station 104 can receive the RTS from the AP while acknowledging. Similarly, the station 104 can decode the RTS/data while acknowledging as the RTS. Thus, such parallelizing ACK and RTS/data transmissions improves the channel usage time, system data throughput, current consumption, and delay performance. The current consumption performance improves because the station 104 and AP 102 do not have to spend extra RF warm-up time (e.g., a number of events requiring switching ON/OFF of RF reduce).

Further, with STAR various combinations are possible (which are described in the following FIGS. 9A to 9H). The below <Table 1> shows the various combinations that are possible using STAR. It may be noted that collision detection is made feasible using the STAR.

TABLE 1

| Case | AP | First Station | Second Station | Third Station |
|---|---|---|---|---|
| 9A | RTS -> First Station | ACK | Idle | Idle |
| 9B | RTS -> First Station | ACK | RTS | Idle |
| 9C | RTS -> First Station | ACK | Idle | RTS |
| 9D | RTS -> First Station | ACK | RTS | RTS |
| 9E | RTS -> Second Station | ACK | Idle | Idle |
| 9F | RTS -> Second Station | ACK | Idle | RTS |

TABLE 1-continued

| Case | AP | First Station | Second Station | Third Station |
|------|----|----|----|----|
| 9G | RTS -> Second Station | ACK | RTS | Idle |
| 9H | RTS -> Second Station | ACK | RTS | RTS |

FIGS. 9A to 9H illustrate sequence diagrams in which collision is detected by the station using STAR, according to an exemplary embodiment of the present disclosure.

Figure 9A:
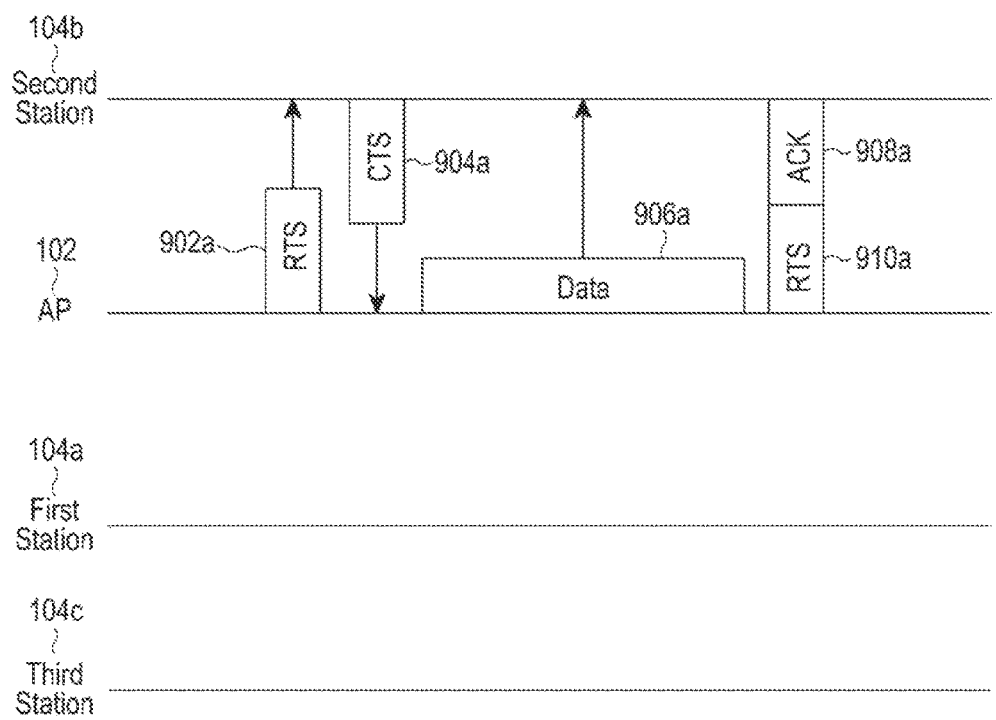
FIGS. 9A to 9H illustrate sequence diagrams in which the AP transmits a aequest to send (RTS) frame to a station while receiving Acknowledgement from a station using STAR, according to an exemplary embodiment of the present disclosure.

As depicted in the FIG. 9A, the AP 102 sends (902a) the RTS frame to the second station 104b. The AP 102 receives (904a) CTS frame from the second station 104b in response to the RTS frame sent to the second station 104b. The channel is established between the AP 102 and the second station 104b when AP 102 receives the CTS frame from the second station 104b.

The AP 102 sends (906a) data to the second station 104b after receiving the CTS frame from the second station 104b.

Further, the second station 104b transmits (908a) ACK to the AP 102. In an embodiment, the second station 104b transmits ACK to the AP 102 while receiving (910a) the RTS frame from the AP 102. Since, the second station 104b is in STAR mode, the second station 104b decodes the RTS from the AP 102 for receiving data from the AP 102.

In an embodiment, the AP 102 sends data to the second station 104b without sending RTS (as at step 910a) to the second station 104b, as the channel is already established between the AP 102 and the second station 104b at step 904a.

In an embodiment, the AP 102 can determine arrival time and contents of the ACK from the second station 104b. The AP 102 decodes the ACK while transmitting the RTS frame or data to the second station 104b using STAR.

The first station 104a and the third station 104c are idle while the data is being transmitted between the AP 102 and the second station 104b. The first station 104a and the third station 104c may enter sleep mode.

Figure 9B:
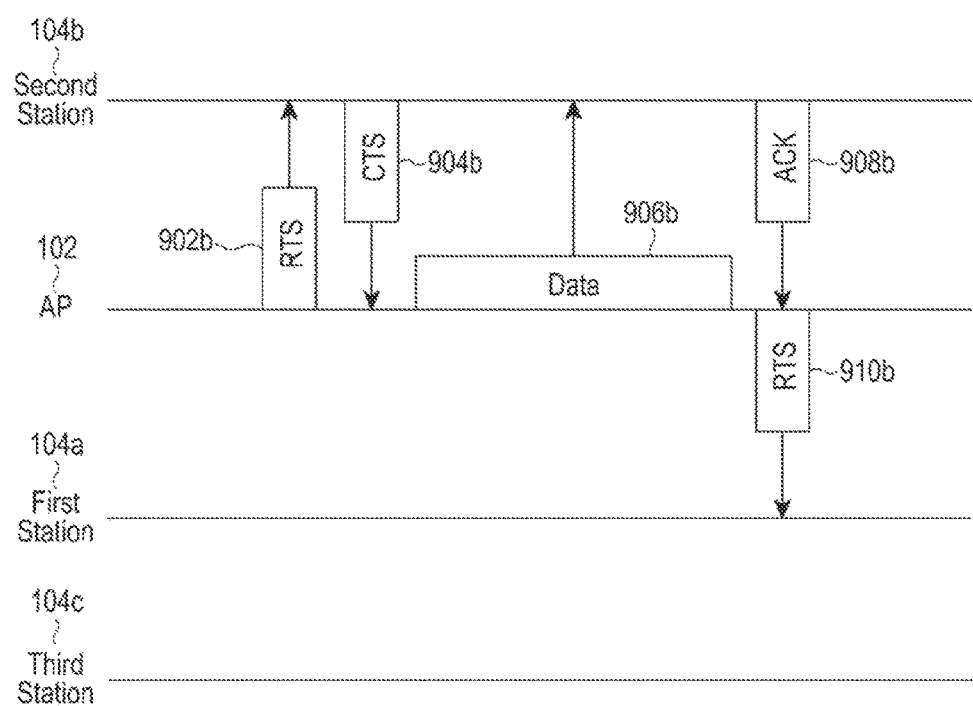

As depicted in the FIG. 9B, the AP 102 sends (902b) the RTS frame to the second station 104b. The AP 102 receives (904b) CTS frame from the second station 104b in response to the RTS frame sent to the second station 104b. The channel is established between the AP 102 and the second station 104b when AP 102 receives the CTS frame from the second station 104b.

The AP 102 sends (906b) data to the second station 104b after receiving the CTS frame from the second station 104b. The second station 102b transmits (908b) ACK to the AP 102.

The AP 102 transmits (910b)RTS frame to the first station 104a while receiving the ACK from the second station 104b.

In an embodiment, the second station 104b decodes RTS using STAR while transmitting ACK to the AP 102. The second station 104b sets NAV based on NAV in RTS frame to the first station 104a.

In an embodiment, the AP 102 can determine arrival time and contents of the ACK from the second station 104b. The AP 102 decodes the ACK while transmitting the RTS frame to the first station 104a using STAR.

In an embodiment, the first station 104a can determine arrival time and contents of the ACK from the second station 104b through NAV and ACK format.

In an embodiment, the third station 104c can determine timing and content the ACK from the second station 104b through NAV and ACK format. In an embodiment, the third station 104c derives NAV based on the RTS frame transmitted by the AP 102 to the first station 104a.

Figure 9C:
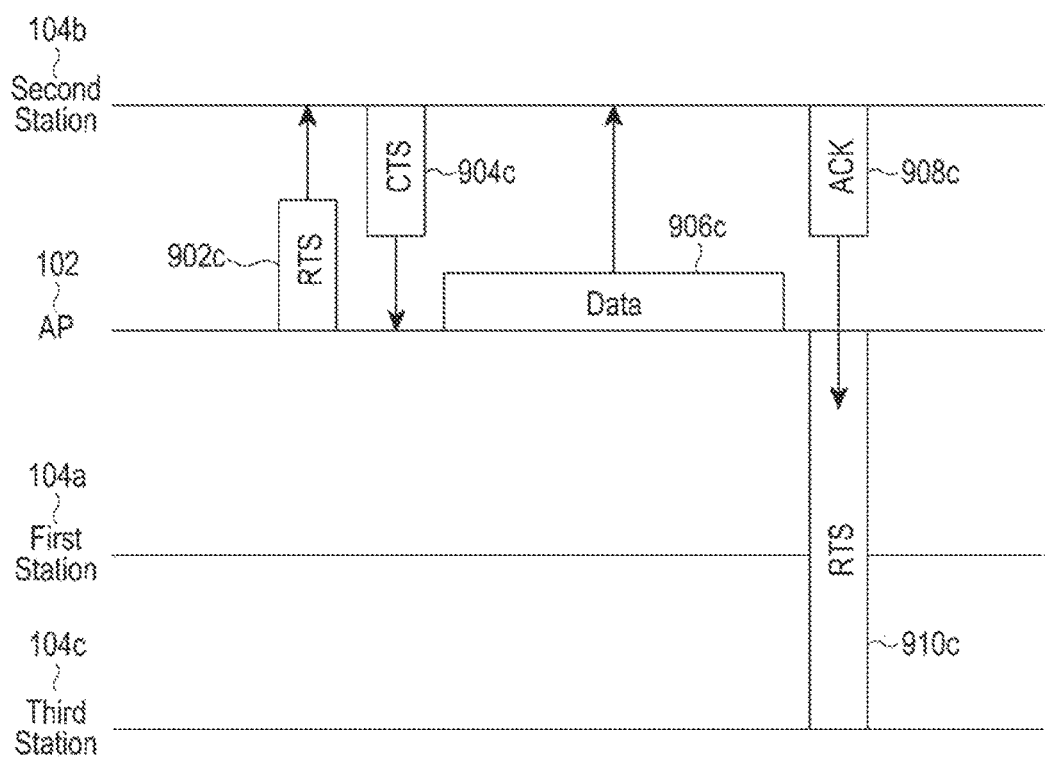

As depicted in the FIG. 9C, the AP 102 sends (902c) the RTS frame to the second station 104b. The AP 102 receives (904c) CTS frame from the second station 104b in response to the RTS frame sent to the second station 104b. The channel is established between the AP 102 and the second station 104b when AP 102 receives the CTS frame from the second station 104b.

The AP 102 sends (906c) data to the second station 104b after receiving the CTS frame from the second station 104b. The second station 102 transmits (908c) ACK to the AP 102.

The AP 102 transmits (910c) RTS frame to the third station 104c while receiving the ACK from the second station 104b.

In an embodiment, the second station 104b decodes RTS using STAR while transmitting ACK to the AP 102. The second station 104b sets NAV based on NAV in RTS frame to the third station 104c.

In an embodiment, the AP 102 can determine arrival time and contents of the ACK from the second station 104b. The AP 102 decodes the ACK while transmitting the RTS frame to the third station 104c using STAR.

In an embodiment, the first station 104a can determine arrival time and contents of the ACK from the second station 104b through NAV and ACK format. The first station 104a derives NAV based on RTS frame to the third station 104c.

In an embodiment, the third station 104c can determine timing and content the ACK from the second station 104b through NAV and ACK format. In an embodiment, the third station 104c can cancel ACK from RTS frame.

Figure 9D:
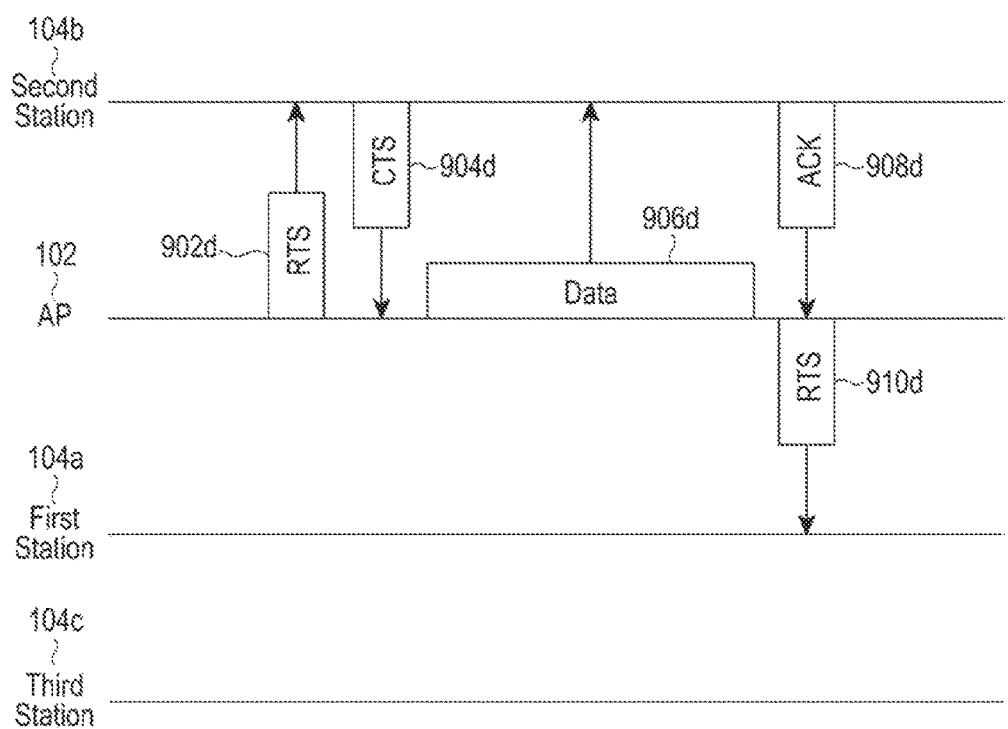

As depicted in the FIG. 9D, the AP 102 sends (902d) the RTS frame to the second station 104b. The AP 102 receives (904d) CTS frame from the second station 104b in response to the RTS frame sent to the second station 104b. The channel is established between the AP 102 and the second station 104b when AP 102 receives the CTS frame from the second station 104b.

The AP 102 sends (906d) data to the second station 104b after receiving the CTS frame from the second station 104b. The second station 102 transmits (908d) ACK to the AP 102.

The AP 102 transmits (910d) RTS frame to the first station 104a while receiving the ACK from the second station 104b.

In an embodiment, the second station 104b decodes RTS using STAR while transmitting ACK to the AP 102. The second station 104b sets NAV based on NAV in RTS frame to the first station 104a.

In an embodiment, the AP 102 can determine arrival time and contents of the ACK from the second station 104b. The AP 102 decodes the ACK while transmitting the RTS frame to the first station 104a using STAR.

In an embodiment, the first station 104a and the third station 104c determine the arrival time and contents of ACK from the first station 104a from NAV and ACK format. The first station 104a and the third station 104c can cancel ACK from the RTS frame.

Figure 9E:
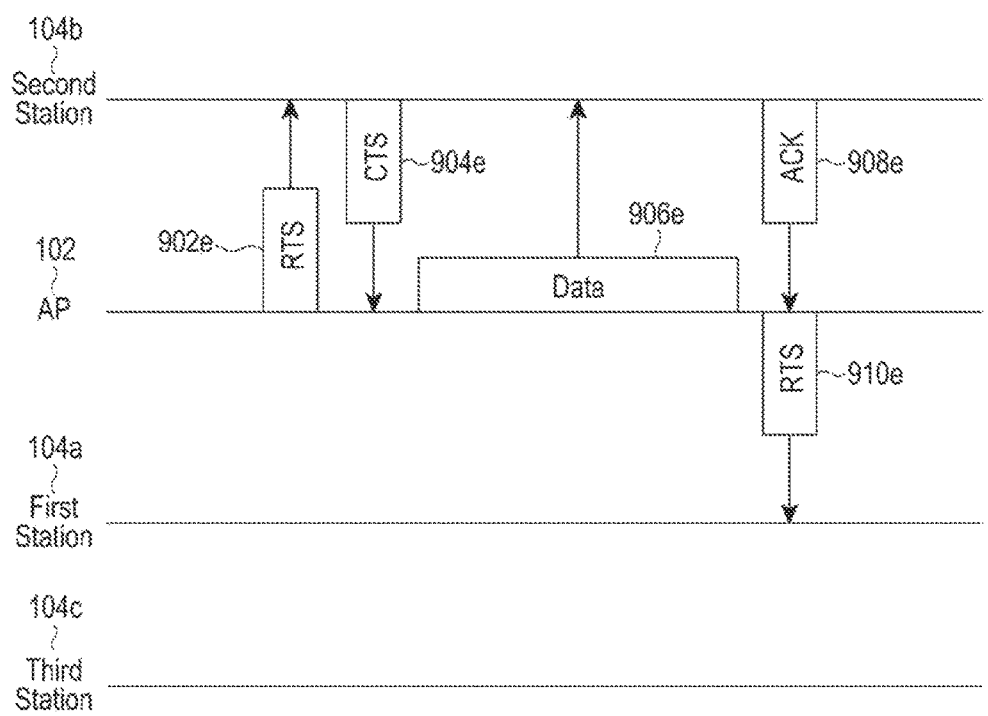

As depicted in the FIG. 9E, the AP 102 sends (902e) the RTS frame to the second station 104b. The AP 102 receives (904e) CTS frame from the second station 104b in response to the RTS frame sent to the second station 104b. The channel is established between the AP 102 and the second station 104b when AP 102 receives the CTS frame from the second station 104b.

The AP 102 sends (906e) data to the second station 104b after receiving the CTS frame from the second station 104b. The second station 102 transmits (908e) ACK to the AP 102.

The AP 102 transmits (910e) RTS frame to the first station 104a while receiving the ACK from the second station 104b.

In an embodiment, the second station 104b decodes RTS using STAR while transmitting ACK to the AP 102. The second station 104b needs to decode the RTS frame sent to the first station 104a to set NAV or to determine whether the data is intended to.

In an embodiment, the AP 102 can determine arrival time and contents of the ACK from the second station 104b. The AP 102 decodes the ACK while transmitting the RTS frame to the first station 104a using STAR.

In an embodiment, the first station 104a can determine arrival time and contents of the ACK from the second station 104b through NAV and ACK format respectively. The first station 104a can cancel ACK from the RTS frame.

Figure 9F:
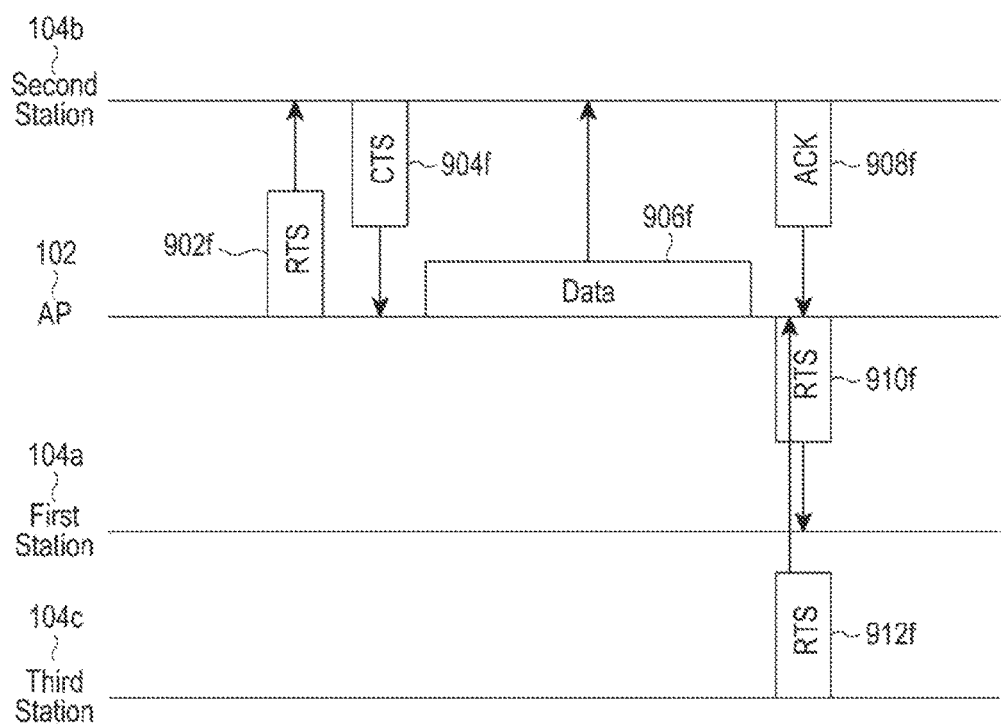

As depicted in the FIG. 9F, the AP 102 sends (902f) the RTS frame to the second station 104b. The AP 102 receives (904f) CTS frame from the second station 104b in response to the RTS frame sent to the second station 104b. The channel is established between the AP 102 and the second station 104b when AP 102 receives the CTS frame from the second station 104b.

The AP 102 sends (906f) data to the second station 104b after receiving the CTS frame from the second station 104b. The second station 102 transmits (908f) ACK to the AP 102.

The AP 102 transmits (910f) RTS frame to the first station 104a while receiving the ACK from the second station 104b.

In an embodiment, the second station 104b decodes RTS using STAR while transmitting ACK to the AP 102. The second station 104b needs to decode the RTS frame sent to the first station 104a to set NAV or to determine whether the data is intended to.

The AP 102 determines timing and contents of the ACK from the second station 104b. When the AP 102 transmits the RTS frame to the first station 104a, the third station 104c transmits (912f) RTS frame to the AP 102. The third station 104c detects the collision of RTS when the preamble of the RTS frame is transmitted.

The AP 102 observes an increase in power for 16 micro seconds and infers the CSMA/CD from the third station 104c.

In an embodiment, the first station 104a can determine arrival time and contents of the ACK from the second station 104b through NAV and ACK format respectively. The first station 104a observes thrice the correlation peaks for short training and observes reduction in input power beyond 16 micro seconds (STF and LTF). Further, the first station 104a infers CSMA/CD from the third station 104c. In an embodiment, the first station 104a cancels ACK from the second station 104b, and STF and LTF from the third station 104c for receiving RTS frame from the AP 102.

The third station 104c can determine arrival time and contents of the ACK from the second station 104b through NAV and ACK format respectively. In an embodiment, the third station 104c can detect the transmission from AP 102 and detects the collision of preambles (STF AND LTF) of its RTS frame. After detecting the collision of preambles, the third station 104c backs off transmission of the payload data of the RTS frame to the AP 102.

Figure 9G:
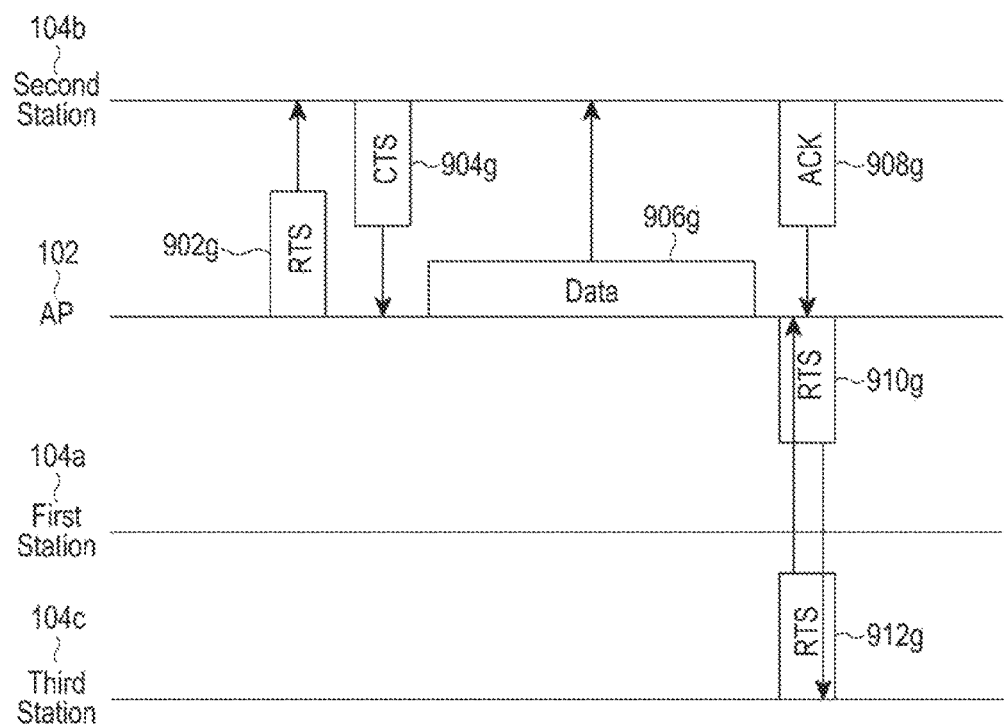

As depicted in the FIG. 9G, the AP 102 sends (902g) the RTS frame to the second station 104b. The AP 102 receives (904g) CTS frame from the second station 104b in response to the RTS frame sent to the second station 104b. The channel is established between the AP 102 and the second station 104b when AP 102 receives the CTS frame from the second station 104b.

The AP 102 sends (906g) data to the second station 104b after receiving the CTS frame from the second station 104b. The second station 104b transmits (908g) ACK to the AP 102.

The AP 102 transmits (910g) RTS frame to the first station 104a while receiving the ACK from the second station 104b.

In an embodiment, the second station 104b decodes RTS using STAR while transmitting ACK to the AP 102. The second station 104b needs to decode the RTS frame sent to the first station 104a to set NAV or to determine whether the data is intended to.

The AP 102 determines timing and contents of the ACK from the second station 104b. When the AP 102 transmits the RTS frame to the first station 104a, the third station 104c transmits (912f) RTS frame to the AP 102. The third station 104c detects the collision of RTS when the preamble of the RTS frame is transmitted.

The AP 102 observes an increase in power for 16 micro seconds and infers the CSMA/CD from the third station 104c. The AP 102 decodes ACK from the second station 104b while transmitting RTS frame to the first station 104a using STAR. Further, the AP 102 detects the collision of RTS frame transmitted by the third station 104c. The AP 102 cancels the preambles of the RTS frame from the third station 104c.

The third station 104c can determine arrival time and contents of the ACK from the second station 104b through NAV and ACK format respectively. In an embodiment, the third station 104c can detect the transmission from AP 102 and detects the collision of preambles (STF AND LTF) of its RTS frame. After detecting the collision of preambles, the third station 104c backs off transmission of the payload data of the RTS frame to the AP 102.

Figure 9H:
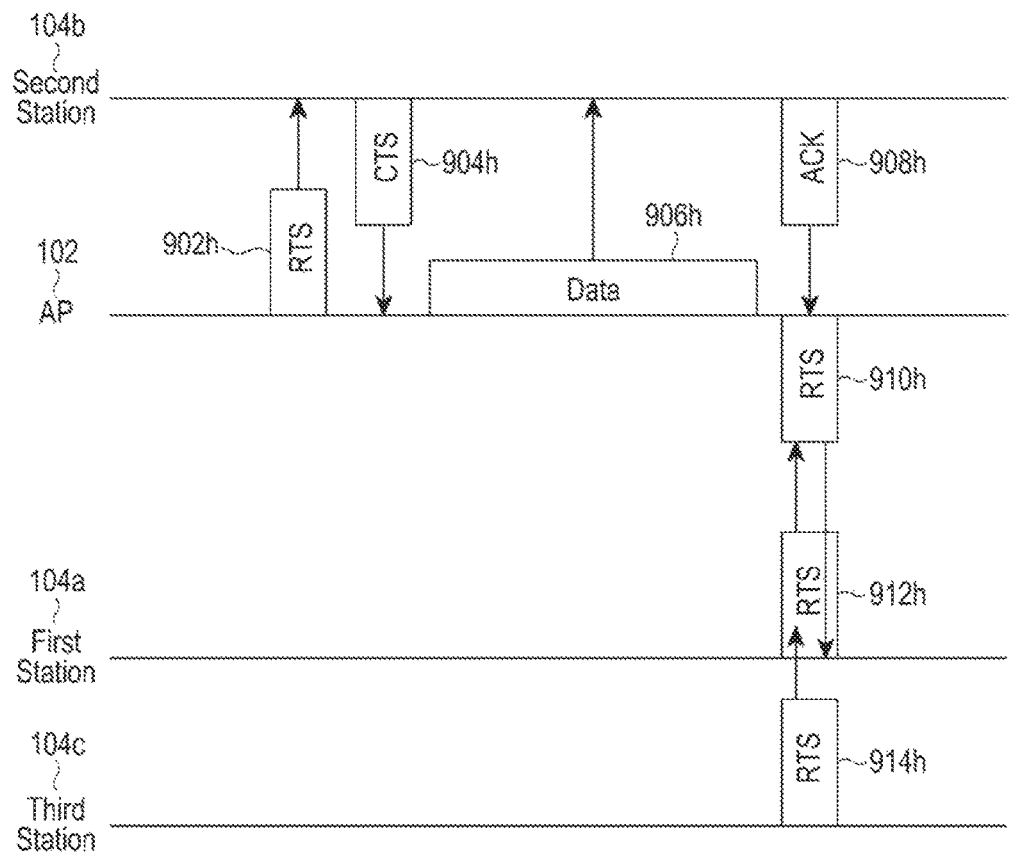

As depicted in the FIG. 9H, the AP 102 sends (902h) the RTS frame to the second station 104b. The AP 102 receives (904h) CTS frame from the second station 104b in response to the RTS frame sent to the second station 104b. The channel is established between the AP 102 and the second station 104b when AP 102 receives the CTS frame from the second station 104b.

The AP 102 sends (906h) data to the second station 104b after receiving the CTS frame from the second station 104b. The second station 104b transmits (908h) ACK to the AP 102.

The AP 102 transmits (910h) RTS frame to the first station 104a while receiving the ACK from the second station 104b.

In an embodiment, the second station 104b decodes RTS using STAR while transmitting ACK to the AP 102. The second station 104b needs to decode the RTS frame sent to the first station 104a to set NAV or to determine whether the data is intended to.

The AP 102 determines timing and contents of the ACK from the second station 104b. When the AP 102 transmits the RTS frame to the first station 104a, the third station 104c transmits (912h) RTS frame to the AP 102. The third station 104c detects the collision of RTS when the preamble of the RTS frame is transmitted.

The AP 102 observes an increase in power for 16 micro seconds and infers the CSMA/CD from the third station 104c. The AP 102 observes multiple correlation peaks in the preambles (STF and LTF) of the RTS frame. The AP 102 decodes ACK from the second station 104b while transmitting RTS frame to the first station 104a using STAR. Further, the AP 102 detects the collision of RTS frame transmitted by the third station 104c. The AP 102 cancels the preambles of the RTS frame from the third station 104c.

In an embodiment, the first station 104a can determine arrival time and contents of the ACK from the second station 104b through NAV and ACK format respectively. The first station 104a performs CSMA/CD using STAR. Further, the first station 104a uses STAR to cancel RTS frame the third station 104c ACK from the second station 104b and self-transmission of RTS frame for receiving RTS frame from the AP 102.

In an embodiment, the first station 104a or the third station 104c detect transmission from the AP 102 to the first station 104a or the third station 104c respectively and hence enter CSMA/CD phase. The first station 104a or the third station 104c backs off transmission of the payload of the RTS frame after transmitting preambles (STF and LTF) of the RTS frame.

Although the FIGS. 9A to 9H illustrate various embodiments of transmitting the RTS frame while receiving the ACK by the AP 102, it may be understood that the other embodiments are not limited thereto. When the AP 102 and the stations 104 in the WLAN are enabled with STAR mode then, many other embodiments of transmitting RTS frame while receiving ACK simultaneously can be made feasible other than the present disclosure described in the FIGS. 9A-9H.

FIGS. 10A to 10G illustrate sequence diagrams in which the AP and the station perform simultaneous transmission and reception using a STAR access protocol in mixed mode, according to an exemplary embodiment of the present disclosure. In an embodiment, the following STAR access protocol in the mixed mode is proposed:

The AP does RTS CTS and continues to transmit even if collision is detected.
    The AP goes for RTS/CTS mechanism when the AP has a packet to transmit
        AP sends RTS
        On success, STA responds with CTS with NAV=SIFS+DATA+SIFS+ACK
        On CTS reception, AP transmits DATA and ACK
The station goes for direct DATA transmission (No RTS CTS)
    The station transmits DATA packet directly after CCA
        On Collision Detection STA backs off (standard manner) before the end of LTF (energy and throughput improvement)
        Full duplex: STA transmits UL DATA concurrently with AP if STA has packet and DATA(AP)≥DATA(STA) then, Duration (CTS)=Duration (RTS)
            Ready DATA packet at STA i.e., either packet of required length is ready or can be made ready by fragmentation (implementation dependent) by the time of DATA Tx
            If the station is in back off stage, back off counter is stopped and DATA Tx on priority basis It is to be noted that the STAR access protocol in mixed mode is provided as an example illustration. With the STAR access protocol in mixed mode, the various operations performed by the AP, STA, in full duplex Downlink (DL), half duplex, half duplex Uplink (UL), non-paired transmission, decoding schemes (STAR and standard) are described in conjunction with FIGS. 10A to 10H.

Figure 10A:
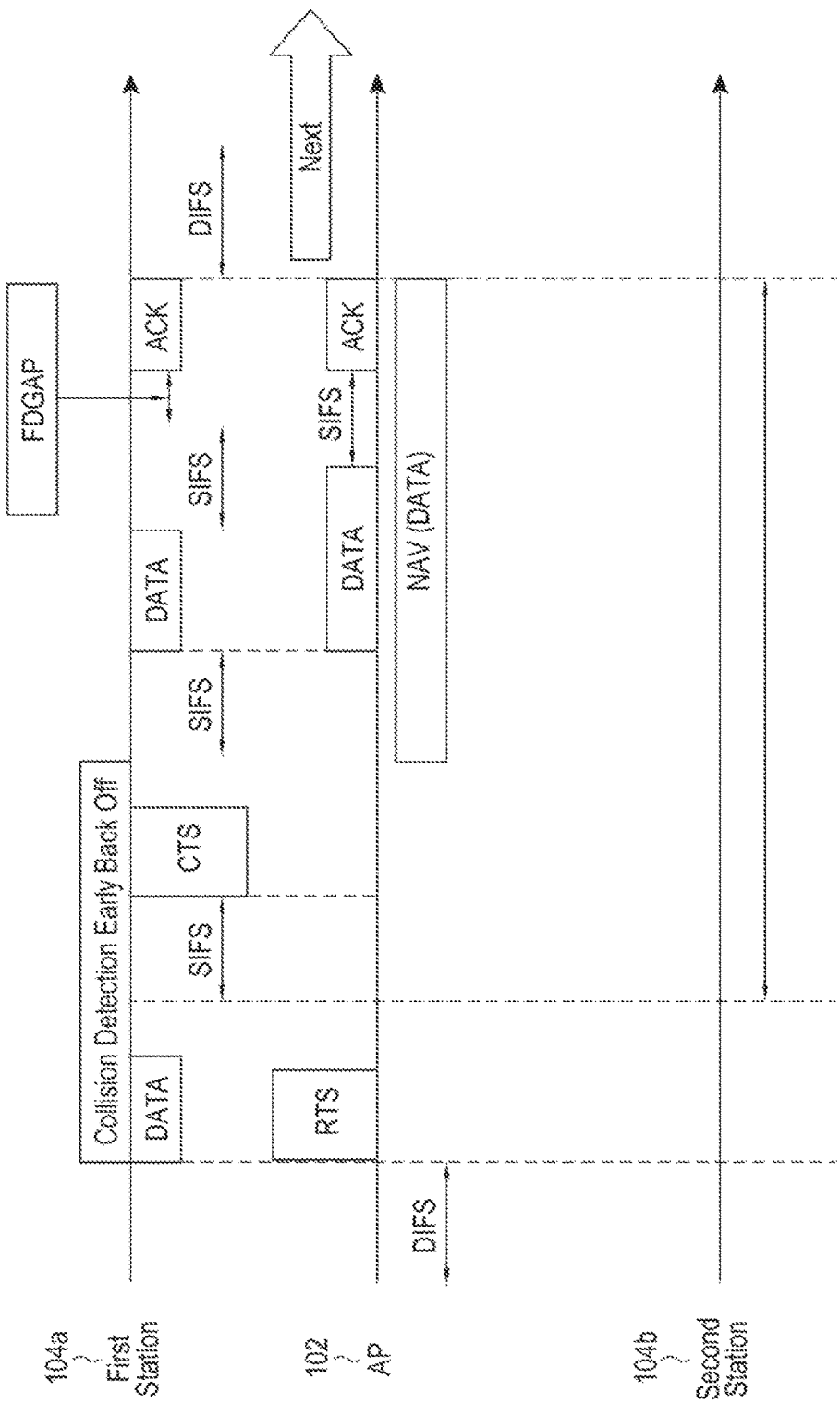
FIGS. 10A to 10G illustrate sequence diagrams in which the AP and the station perform transmission and reception using a STAR access protocol in mixed mode, according to an exemplary embodiment of the present disclosure.

FIG. 10A illustrates full duplex DL paired transmission between the AP and the station using STAR access protocol in mixed mode, according to an exemplary embodiment of the present disclosure.

Referring to FIG. 10A, the AP 102 initiates transmission of RTS frame to the first station 104a. The first station 104a transmits DATA to the AP 102, which is a paired transmission between the AP 102 and the first station 104a. When the AP 102 initiates transmission of RTS frame and the first station 104a transmits DATA to the AP 102, the first station 104a backs off transmission of DATA and the. AP 102 continues to transmit RTS frame to the first station 104a.

If full duplex data condition (FDDC) is satisfied then, the first station 104a sends the CTS frame with NAV duration=DATA+SIFS+ACK. The full duplex transmission is performed by the AP 102 and the first station 104a. The FDDC is satisfied when the DATA of first station 104a is less than or equal to DATA of the AP 102. In case, when the FDDC is not satisfied then, DATA of required length can be made ready by fragmentation (implementation dependent) by the time of DATA transmission.

In an embodiment, the first station 104a transmits DATA to the AP 102 during the NAV duration while receiving the DATA from the AP 102. The first station 104a transmits ACK to the AP 102 while receiving the ACK from the AP 102 at the same time interval. The time interval is equal to longest (DATA (AP), DATA (STA))+SIFS.

It may be noted that the FDGAP is introduced to allow ACK transmission by the AP 102. The FDGAP can be calculated as difference of duration of DATA from the AP 102 and duration of DATA from the first station 104a (FDGAP=Duration of DATA (AP)-DATA (STA)).

When the first station 104a has contended with DATA, the first station 104a can send Full Duplex communication by prioritizing from back off state. It may be noted that in case of full duplex DL paired transmission throughput improvement and energy saving can be achieved.

Figure 10B:
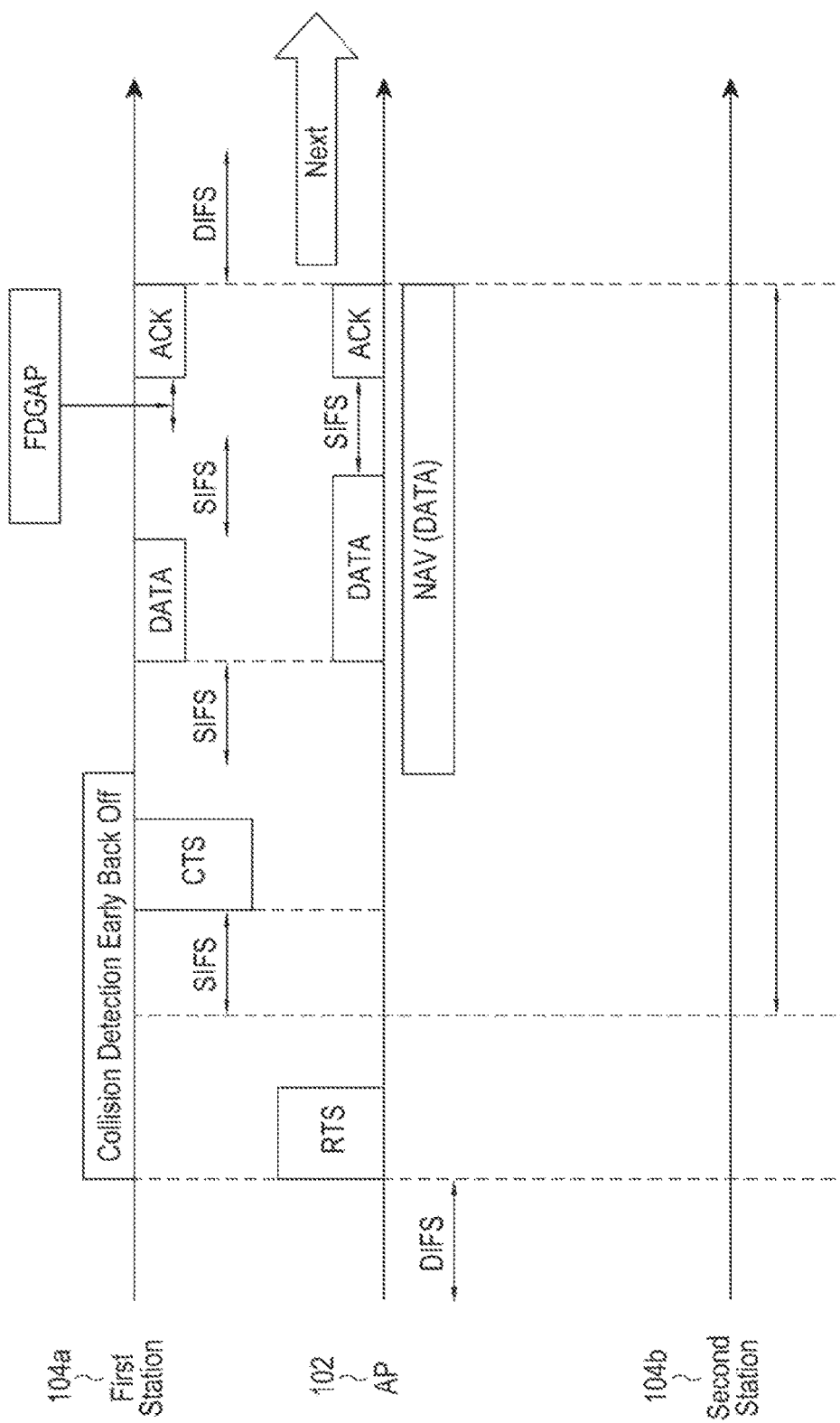

FIG. 10B illustrates a full duplex DL transmission when only AP has the DATA to transmit, according to an exemplary embodiment of the present disclosure.

Referring to FIG. 10B, the AP 102 initiates transmission of RTS frame to the first station 104a. In case A, when the AP 102 has DATA to transmit, the AP 102 transmits DATA to the first station 104a as a standard transmission.

In case B, where the first station 104a has DATA to transmit to the AP 102 as explained in the FIG. 10A, the first station 104a joins AP 102 for full duplex communication. In an embodiment, the DATA transmission of the first station 104a is prioritized.

In an embodiment, the first station 104a can terminate back off counter and transmits the DATA to the AP 102 (if the first station 104a has packet). It may be noted that in case of full duplex DL transmission with only AP 102 achieves throughput improvement and energy saving.

Figure 10C:
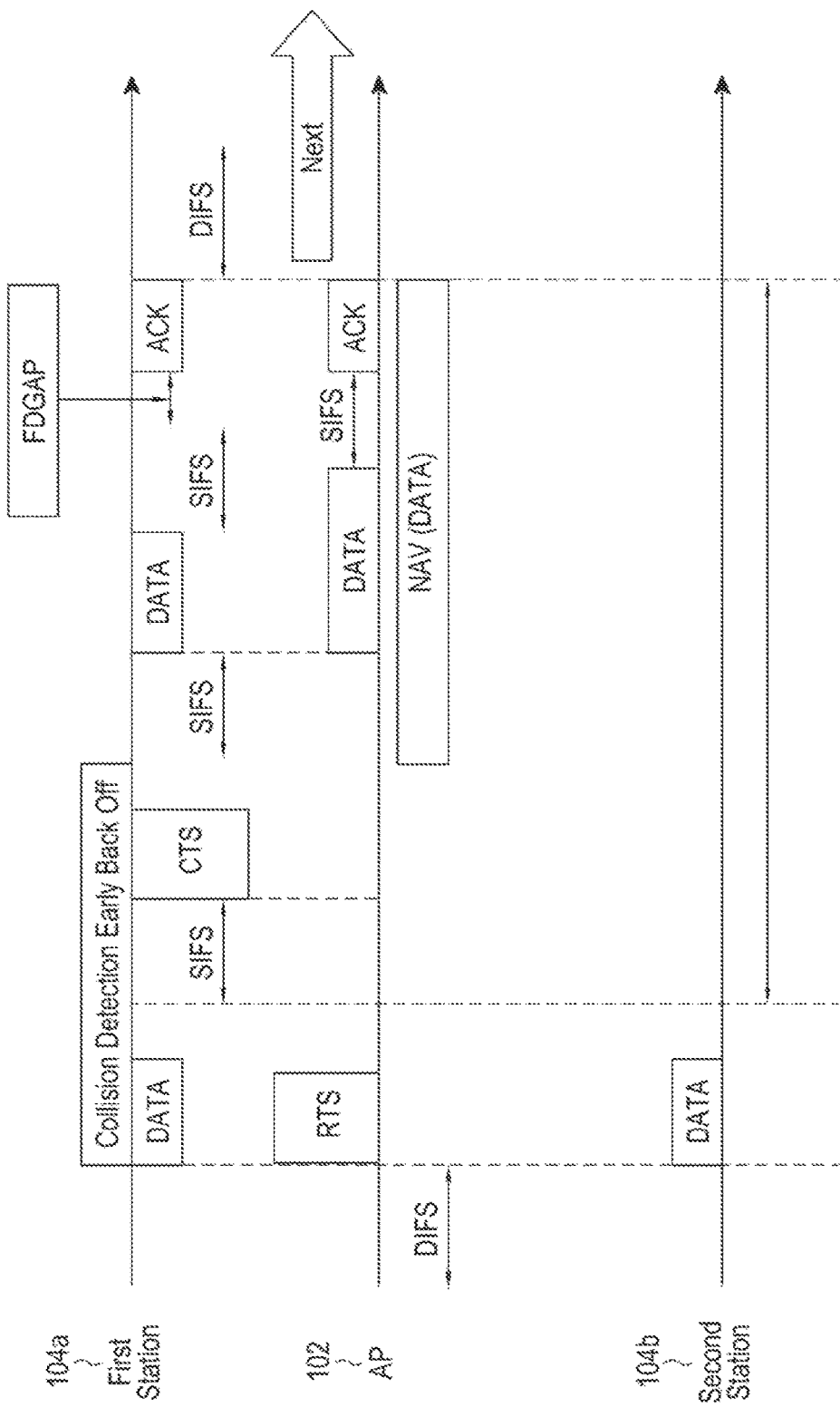

FIG. 10C illustrates a full duplex DL transmission where the AP transmits RTS and two or more stations transmit DATA to the AP, according to an exemplary embodiment of the present disclosure.

Referring to FIG. 10C, the AP 102 initiates transmission of RTS frame to the first station 104a. In this case, the first station 104a and the second station 104b has the DATA to transmit to the AP 102 (as shown in the FIG. 10C, two or more stations are transmitting DATA to the AP 102). The first station 104a and the second station 104b back off and the AP 102 continues to transmit RTS frame to the first station 104a.

If the AP 102 and the first station 104a are paired as explained in the FIG. 10A then, the first station 104a can contend to transmit DATA to the AP 102. The first station 104a sends DATA to the AP 102 while receiving DATA from the AP 102 as in the FIG. 10A.

If the first station 104a is not contending (as in the FIG. 10B), if the first station 104a has DATA then, the full duplex communication occurs, else standard communication occurs. It may be noted that in case of full duplex DL transmission throughput improvement and energy saving can be achieved.

Figure 10D:
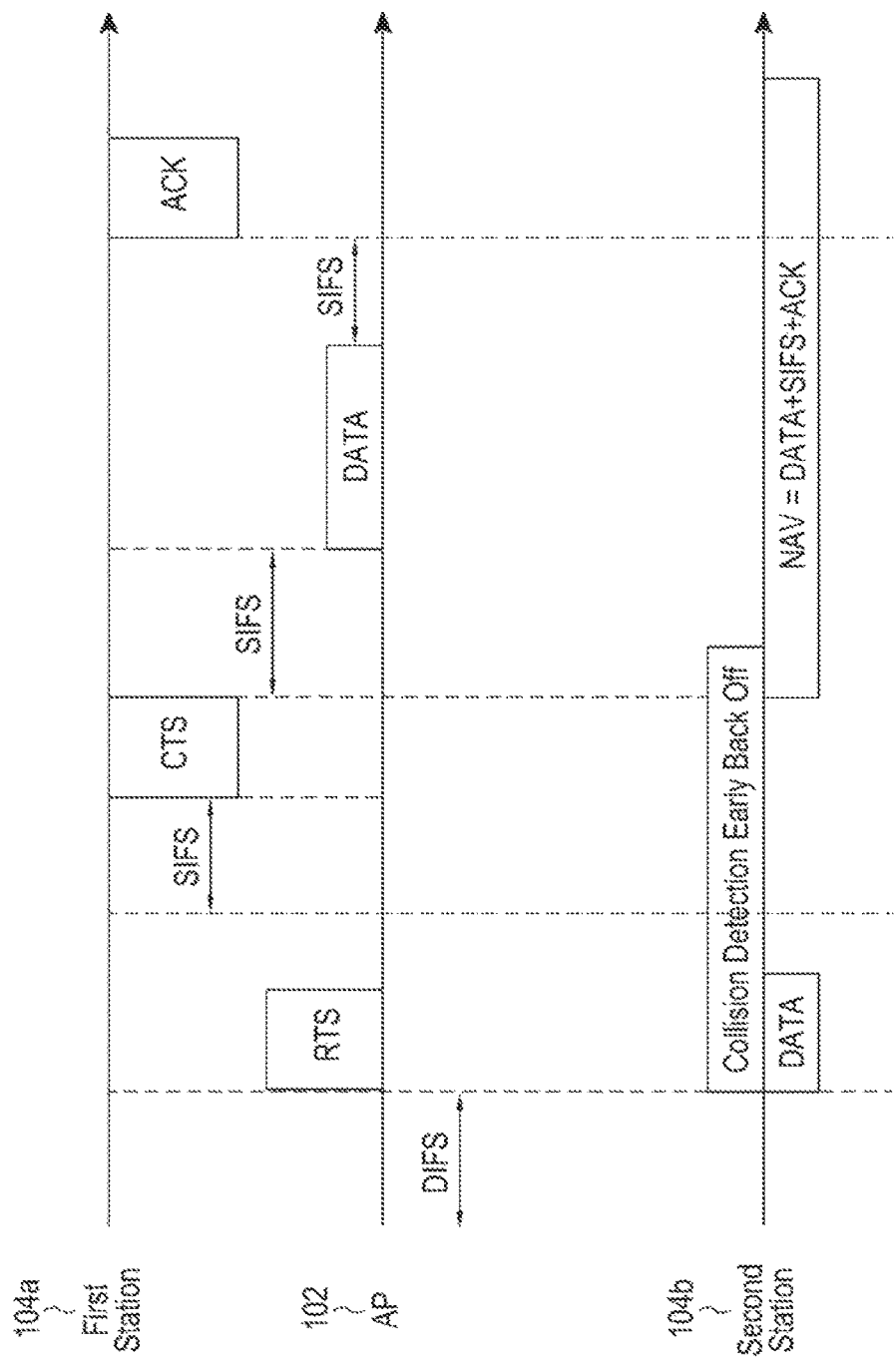

FIG. 10D illustrates the AP with non-paired transmission, according to an exemplary embodiment of the present disclosure.

Referring to FIG. 10D, when the AP 102 transmits RTS frame to the first station 104a and the second station 104b transmits DATA to the AP 102 then, the second station 104b backs off transmission of DATA to the AP while the AP 102 continues transmit RTS frame to the AP 102.

The first station 104a sends CTS frame to the AP 102 and the AP 102 sends DATA to the first station 104a. When, the first station 104a has DATA to transmit to the AP 102, the first station 104a can send DATA to the AP 102 by prioritization (if the first station 104a has a ready packet) as in the FIG. 10A.

Figure 10E:
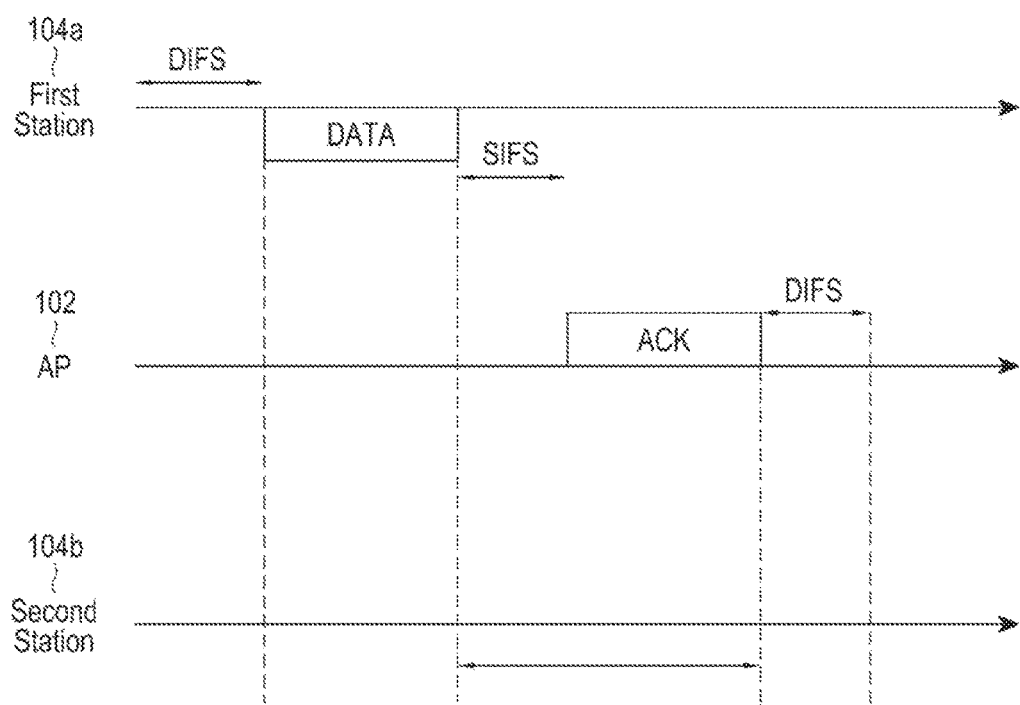

FIG. 10E illustrates a half-duplex Uplink (UL) transmission, according to an exemplary embodiment of the present disclosure.

Referring to FIG. 10E, after expiry of DIFS interval, the first station 104a transmits DATA to the AP 102, the AP 102 transmits ACK to the first station 104a after SIFS interval. It may be noted that there is no exchange of RTS frame and CTS frame between the AP 102 and the first station 104a. Further, there is no NAV duration set by the first station 104a for transmission of DATA to the AP 102.

Figure 10F:
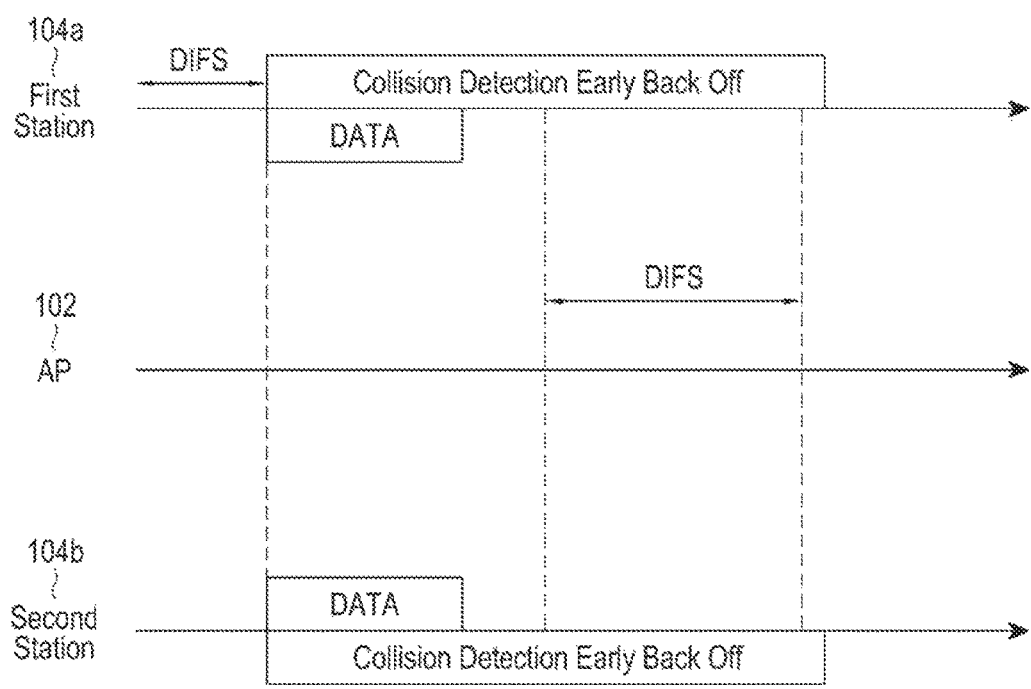

FIG. 10F illustrates a half-duplex UL transmission where two stations transmit data to the AP and the stations back off transmission of DATA, according to an exemplary embodiment of the present disclosure.

Referring to FIG. 10F, when the first station 104a and the second station 104b transmits DATA to the AP at the same time interval, the first station 104a and the second station 104b detect the collision and back off transmission of DATA to the AP 102 after detecting the collision. In an embodiment, the first station 104a and the second station 104b detect the collision and are backed off early even before the collision. Thus, savings in terms of power can be achieved and the data transmission is restarted by the first station 104a and the second station 104b.

Figure 10G:
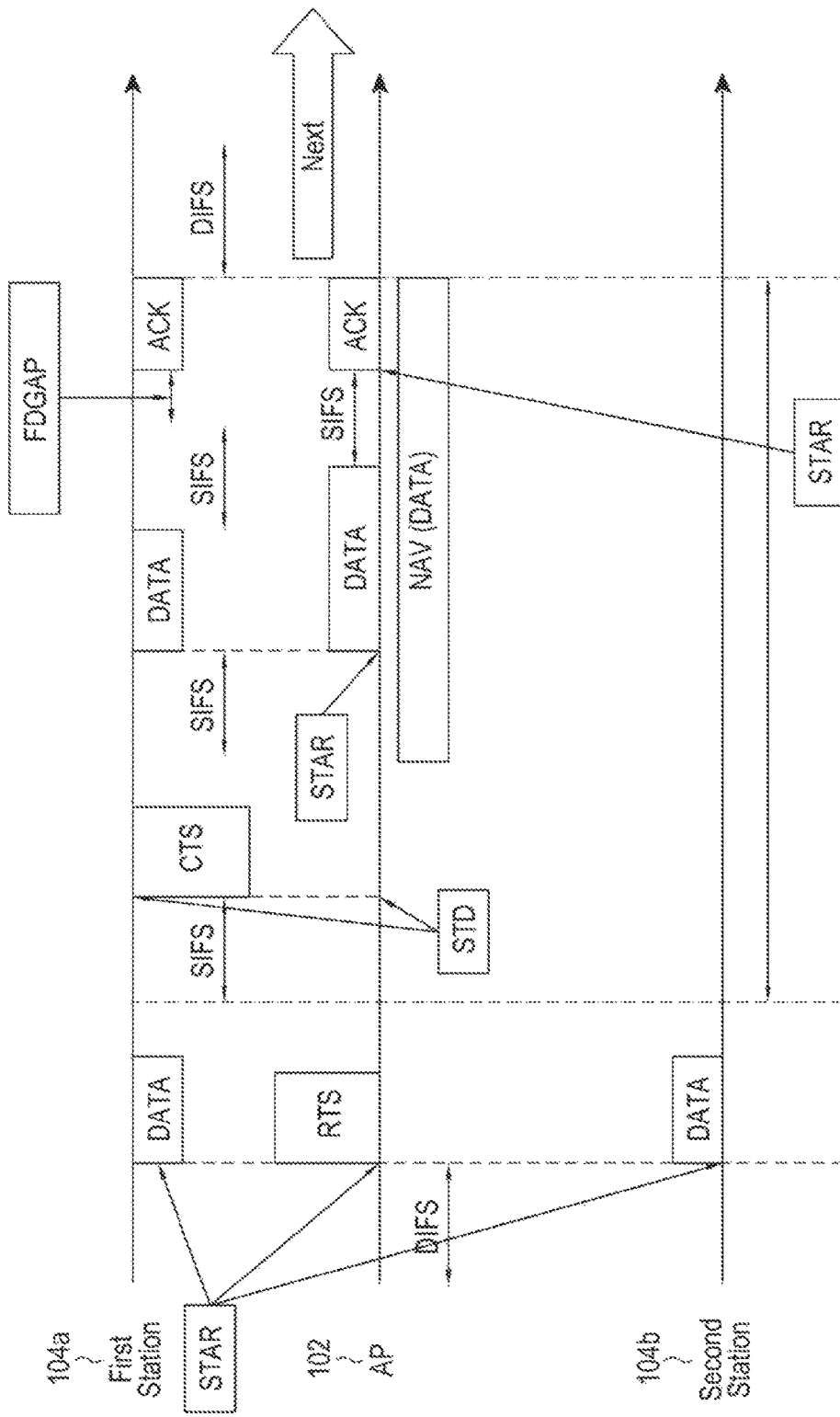

FIG. 10G illustrates decoding schemes such as STAR and standard are implemented at the station and the AP, according to an exemplary embodiment of the present disclosure.

Referring to FIG. 10G, the AP 102, the first station 104a and the second station 104b) use STAR while transmitting RTS and DATA. Further, the station 104 uses standard decoding (without STAR) while the AP 102 is receiving the CTS frame from the station 104 or the station 104 is transmitting the CTS frame to the AP 102. It may be noted that the AP 102 switches from the STAR mode to the standard decoding and power consumption is reduced with the effect of switching from STAR mode to standard decoding.

When the first station 104a or the second station 104b is transmitting DATA or ACK to the AP 102, the first station 104a or the second station 104b uses STAR to transmit DATA or ACK, else the station 104 uses standard procedure when there is no DATA to transmit to the AP 102. Thus, the station 104 uses standard procedure instead of STAR to achieve significant power savings when there is no DATA to transmit to the AP 102.

While receiving the DATA or ACK from the first station 104a or the second station 104b, the AP 102 uses STAR to receive DATA or ACK as shown in the FIG. 10G.

Figure 11A:
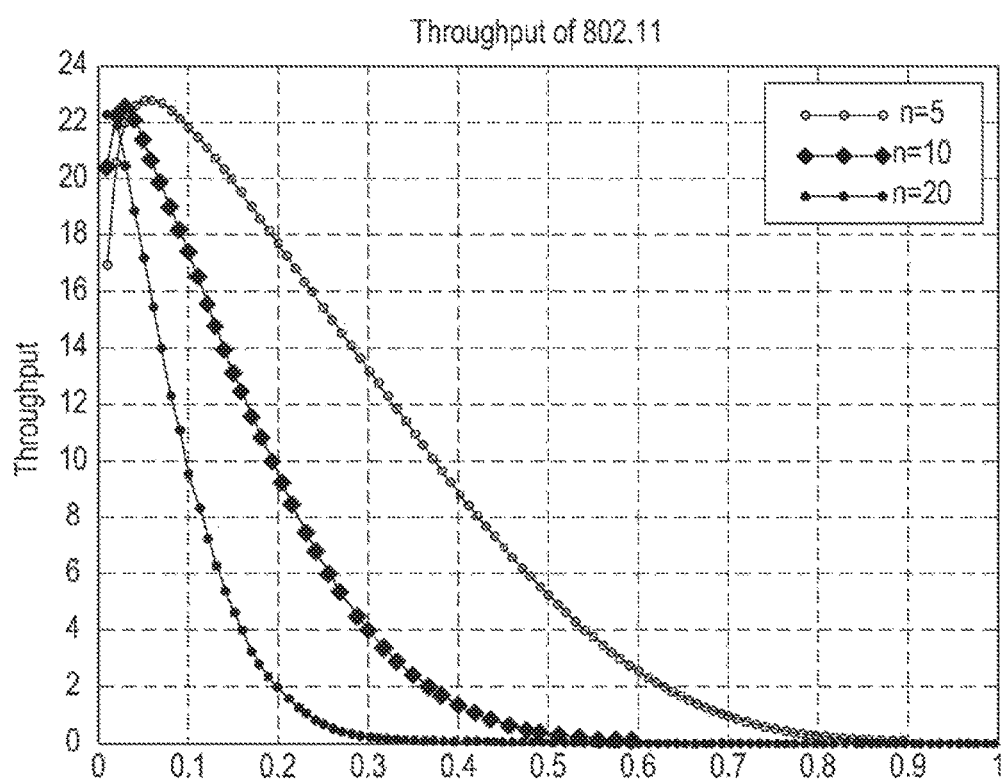
FIGS. 11A and 11B are graphs showing throughput with standard CSMA/CA and with STAR access protocol in mixed mode respectively, according to an exemplary embodiment of the present disclosure.
Figure 11B:
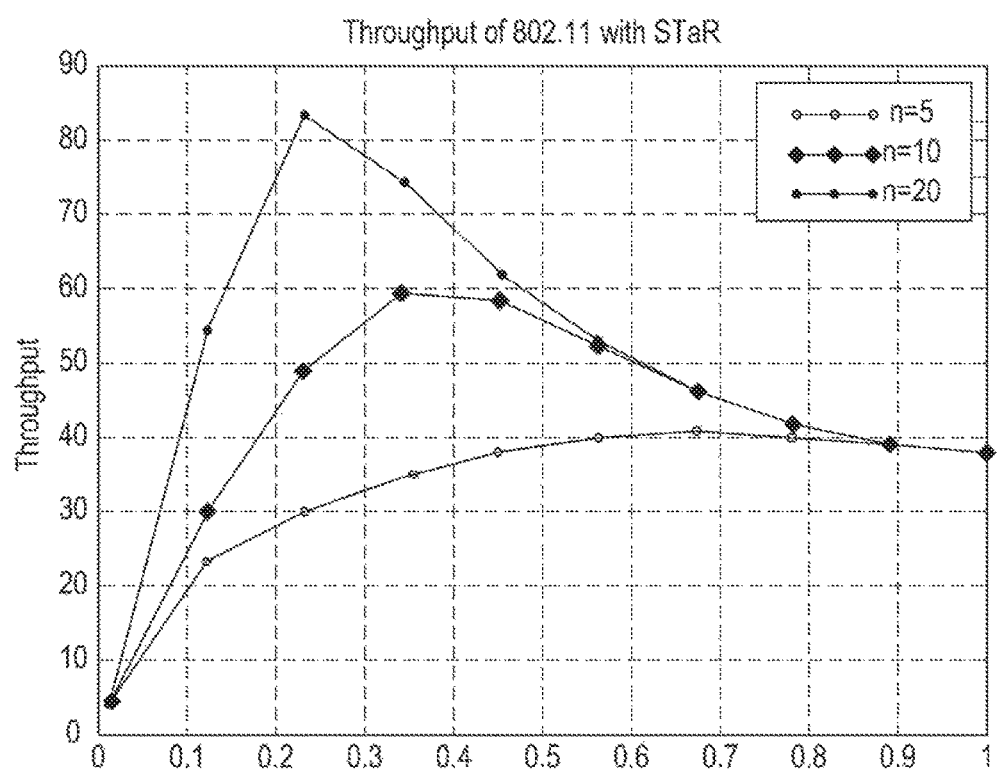

FIGS. 11A and 11B are graphs showing throughput with standard CSMA/CA and with STAR access protocol in mixed mode respectively, according to an exemplary embodiment of the present disclosure. To create example simulation, an IEEE 802.11n system with a data rate of 54 mega bits per second (Mbps), a MAC payload of 8148 bits and other standard parameters are considered.

Referring to FIG. 11A, it can be inferred that the saturation throughput of the standard CSMA/CA is approximately 17 Mbps at an attempt probability of approximately 0.5. When the number of nodes (n) increases, the saturation throughput has reached early (the saturation throughput varies from 0.01-0.05 for the nodes in range of 5-20).

Referring to FIG. 11B, it can be inferred that the saturation throughput for the proposed STAR access protocol in mixed mode reaches to 60 Mbps for n equals to 10. Further, the saturation output reaches to 80 Mbps for n equals to 20. It may be noted that the throughput has improved over three times which indicates a drastic capacity improvement in the throughput. Furthermore, it can also be observed that the attempt probability for saturation throughput has increased by three times which corroborate the capacity enhancement.

The simulation shown in the FIGS. 11A and 11B are only for illustrative purpose and does not limit the scope of the invention. It is to be understood that other embodiments are not limited thereon.

FIGS. 12A to 12G illustrate sequence diagrams in which the AP and the station perform transmission and reception using a STAR access protocol in mode R, according to an exemplary embodiment of the present disclosure. In an embodiment, the following STAR access protocol in the mode R is proposed:

The AP does RTS CTS and continues to transmit even if collision detected
    AP goes for RTS/CTS mechanism when the AP has a packet to transmit
    AP sends RTS é on success STA responds with CTS with NAV=SIF S+DATA+SIF S+ACK
    On CTS reception AP transmits DATA and ACK
The station also go for RTS/CTS for transmission initiation, Backs off on CD
    The station goes of RTS/CTS if packet for transmission, back off on collision detection as earlier
    FULL DUPLEX: Can occur in the following conditions
    If both AP and STA (paired) send RTS, the station backs off but transmits concurrently with AP.
    If only AP sends RTS or unpaired station sends RTS but paired STA has packet to transmit.
    If station has packet and DATA (AP)≥DATA (STA) Duration (CTS)=Duration (RTS).
    Ready DATA packet at station i.e., either packet of required length is ready or can be made ready by fragmentation (implementation dependent) by the time of DATA Tx.
    If the station is in back off stage, back off counter is stopped and DATA Tx on priority basis.

It is to be noted that the STAR access protocol in mode R is provided as an example illustration. With the STAR access protocol in mode R, the various operations performed by the AP and station in full duplex downlink (DL), half duplex, half duplex Up Link (UL), non-paired transmission, decoding schemes (STAR and standard) are described in conjunction with FIGS. 12A to 12H.

Figure 12A:
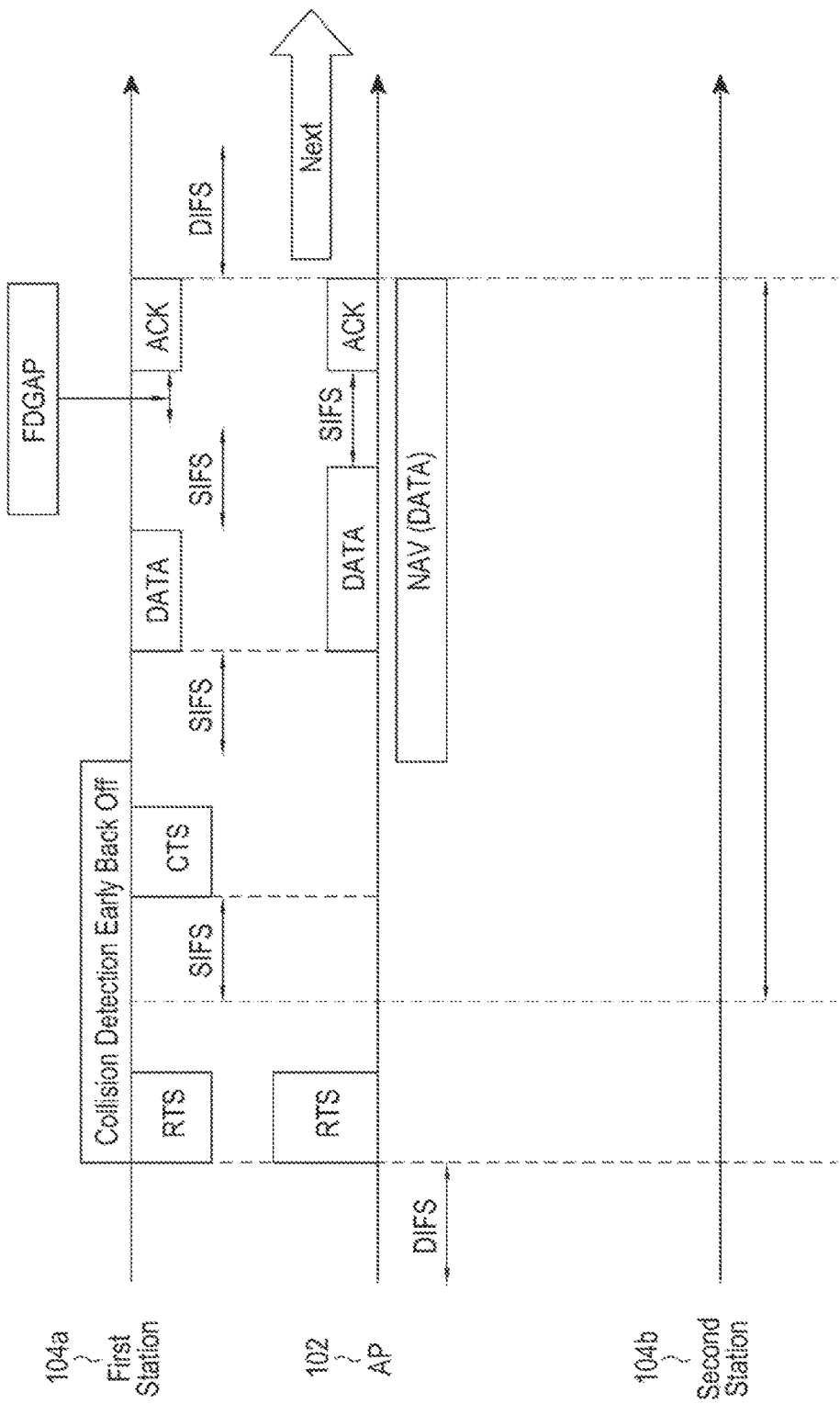
FIGS. 12A to 12G illustrate sequence diagrams in which the AP and the station perform transmission and reception using a STAR access protocol in mode R, according to an exemplary embodiment of the present disclosure.

FIG. 12A illustrates a full duplex DL paired transmission between the AP and the station, according to an exemplary embodiment of the present disclosure.

Referring to FIG. 12A, the AP 102 initiates transmission of RTS frame to the first station 104a. The first station 104a transmits RTS to the AP 102. The first station 104a backs off transmission of RTS to the AP 102. The AP 102 continues to transmit RTS frame to the first station 104a.

If full duplex data condition (FDDC) is satisfied, the first station 104a sends the CTS frame with NAV duration=DATA+SIFS+ACK. The full duplex transmission is performed by the AP 102 and the first station 104a.

In an embodiment, the first station 104a transmits DATA to the AP 102 during the NAV duration while receiving the DATA from the AP 102. In case, the first station 104a has contended with DATA, the first station 104a transmits DATA to the AP 102 by prioritizing from back off state.

The first station 104a transmits ACK to the AP 102 while receiving the ACK from the AP 102 at the same time interval. The time interval is equal to longest (DATA (AP), DATA (STA))+SIFS.

It may be noted that the FDGAP is introduced to allow ACK transmission by the AP 102. The FDGAP can be calculated as difference of duration of DATA from the AP 102 and duration of DATA from the first station 104a.

Figure 12B:
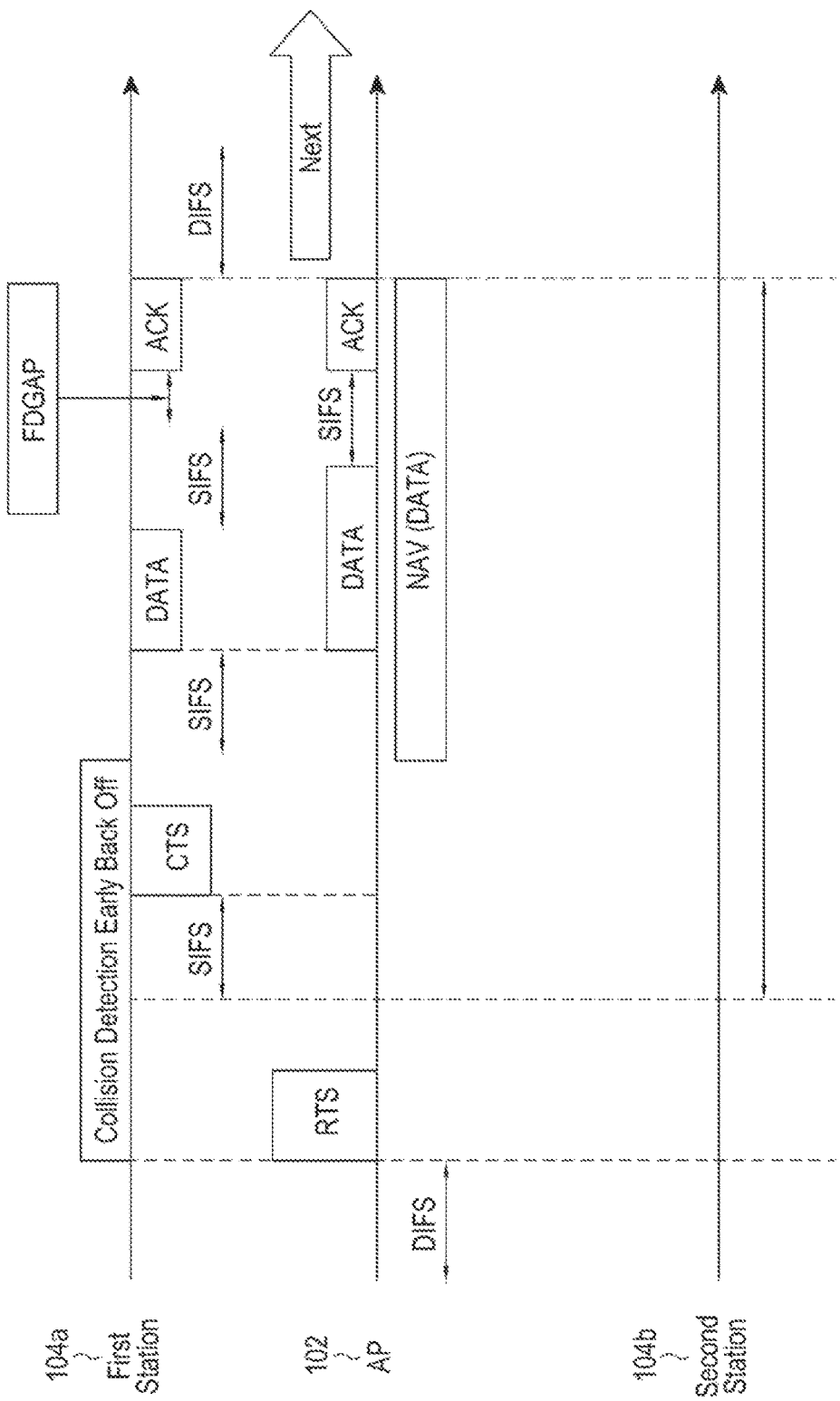

FIG. 12B illustrates a full duplex DL transmission only when AP has the DATA to transmit, according to an exemplary embodiment of the present disclosure.

Referring to FIG. 12B, the AP 102 initiates transmission of RTS frame to the first station 104a. In case A, when the AP 102 has DATA to transmit, the AP 102 transmits DATA to the first station 104a in a standard manner (standard transmission).

In case B, where the first station 104a has DATA to transmit to AP 102 as explained in the FIG. 11A, the first station 104a joins AP 102 for full duplex communication. In an embodiment, the DATA transmission of the first station 104a is prioritized as explained in the FIG. 12A.

Figure 12C:
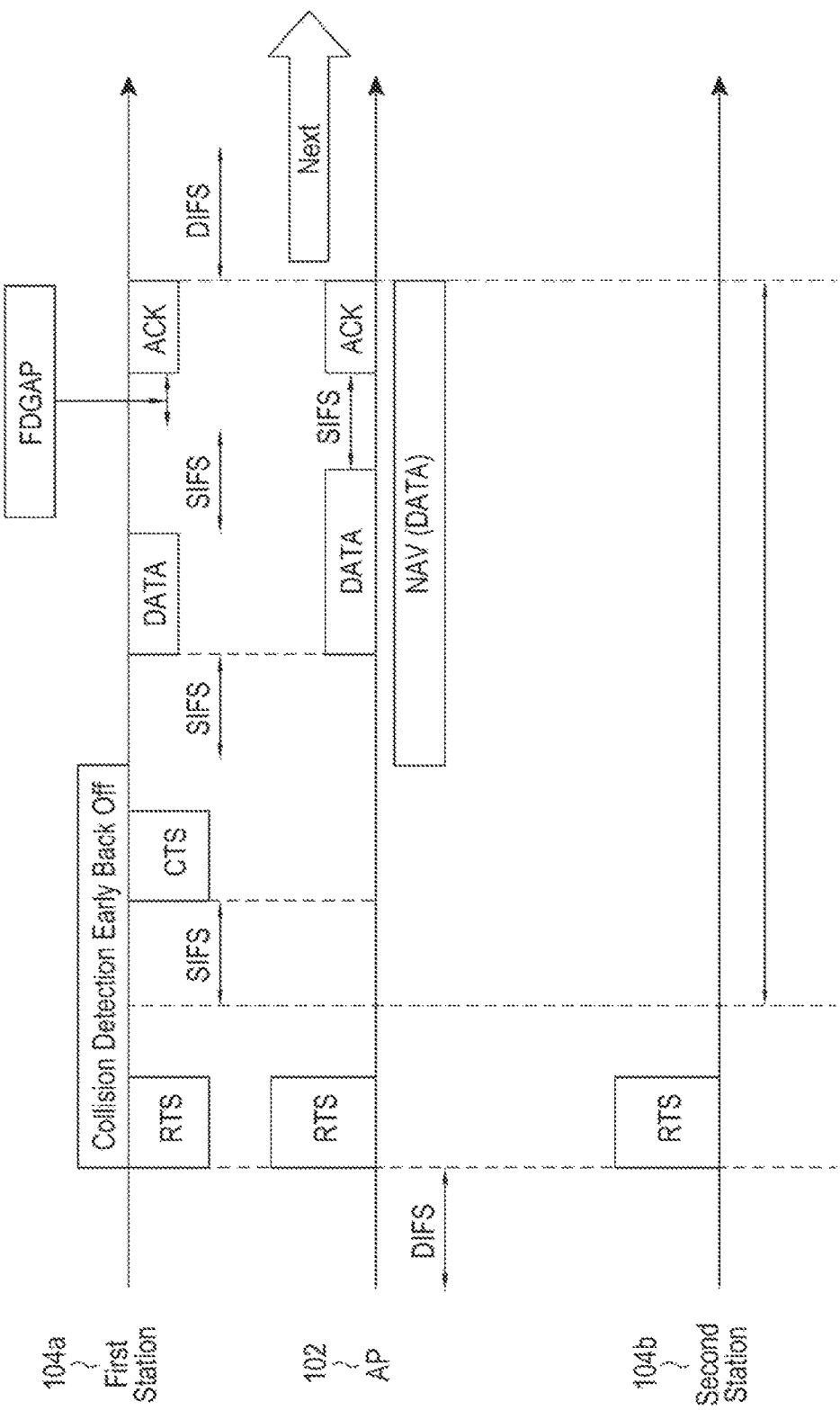

In an embodiment, the first station 104a can terminate back off counter and transmits the DATA to the AP 102. It may be noted that in case of full duplex DL transmission throughput improvement and energy saving can be achieved. FIG. 12C illustrates a full duplex DL transmission where the AP 102 transmits RTS and two or more (≥2) stations transmit DATA to the AP 102, according to an exemplary embodiment of the present disclosure.

Referring to FIG. 12C, the AP 102 initiates transmission of RTS frame to the first station 104a. The first station 104a and the second station 104b transmit RTS frame to the AP 102. The first station 104a and the second station 104b back off and the AP 102 continues to transmit RTS frame to the first station 104a.

When the AP 102 and the first station 104a are paired as explained in the FIG. 12A then, the first station 104a can contend to transmit DATA to the AP 102. The first station 104a sends DATA to the AP 102 while receiving DATA from the AP 102 as in the FIG. 12A.

When the first station 104a is not contending, the DATA transmission of the first station 104a is prioritized as explained in the FIG. 12B. It may be noted that in case of full duplex DL transmission throughput improvement and energy saving can be achieved.

Figure 12D:
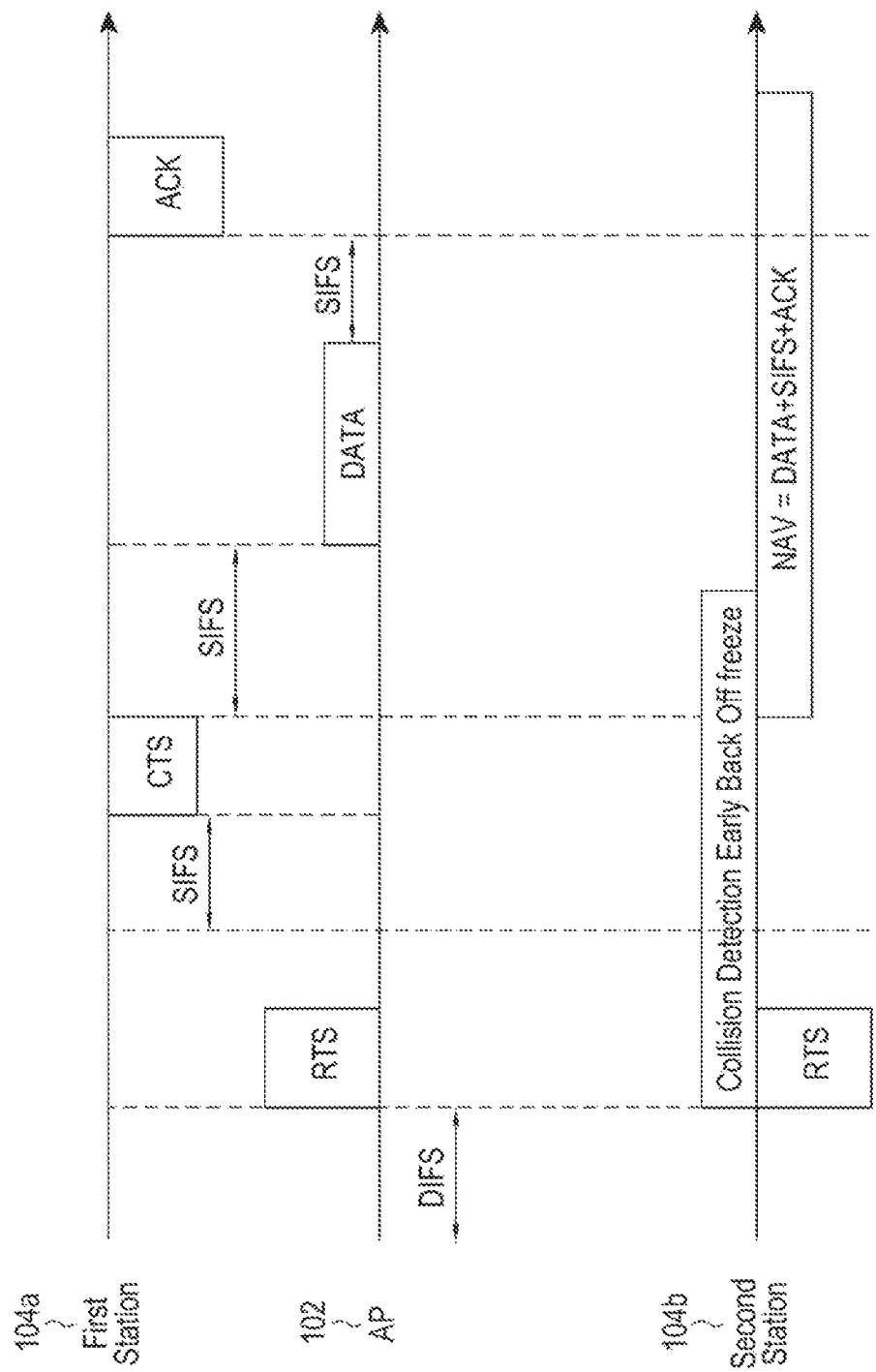

FIG. 12D illustrates the AP with non-paired transmission, according to an exemplary embodiment of the present disclosure.

Referring to FIG. 12D, In case of non-paired transmission, i.e., when the AP 102 transmits RTS frame to the first station 104a and the second station 104b transmits RTS frame to the AP 102 then, the second station 104b backs off transmission of RTS to the AP 102 while the AP 102 continues transmit RTS frame to the AP 102.

The first station 104a sends CTS frame to the AP 102 and the AP 102 sends DATA to the first station 104a. In case, the first station 104a has DATA to transmit to the AP 102, the first station 104a can send DATA to the AP 102 by prioritization as in the FIG. 12A.

Figure 12E:
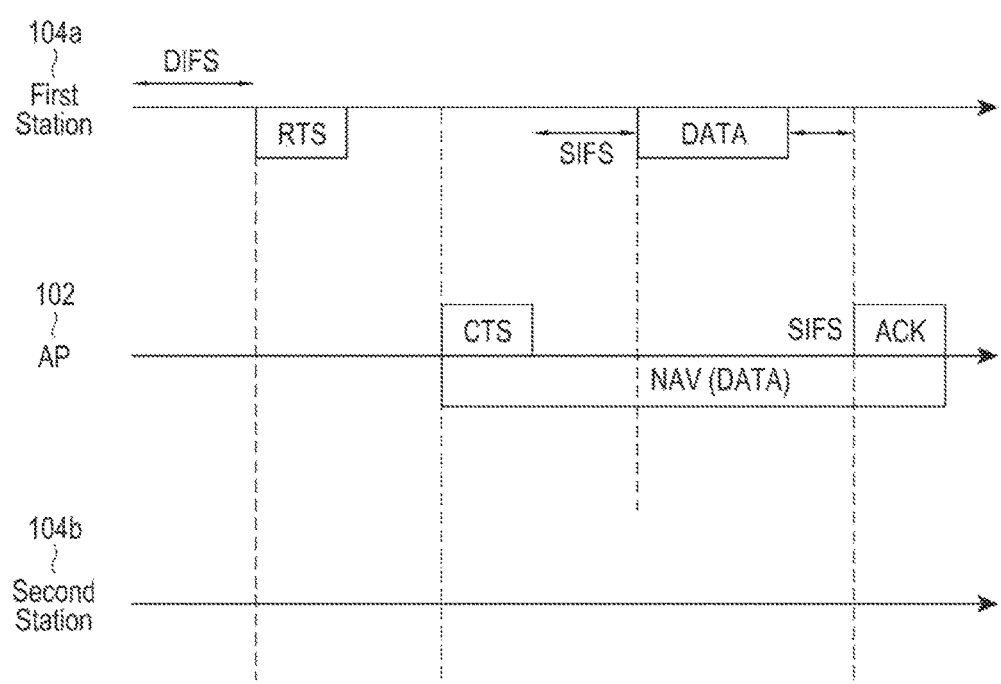

FIG. 12E illustrates a normal data transmission in UL, according to an exemplary embodiment of the present disclosure.

Referring to FIG. 12E, when the first station 104a transmits RTS frame to the AP 102, the AP 102 transmits CTS to the first station 104a. Normal data transmission occurs between the first station 104a and the AP 102 as shown in the FIG. 12E.

Figure 12F:
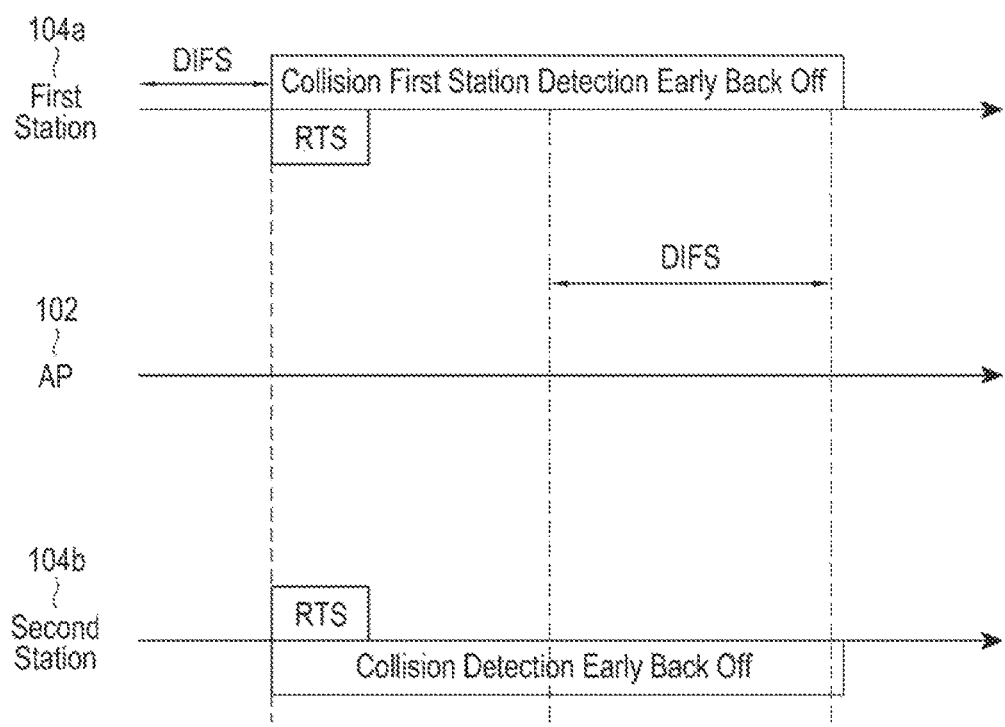

FIG. 12F illustrates a normal data transmission where more than two (?2) stations transmit RTS to AP and the stations back off transmission of data, according to the present disclosure as disclosed herein.

Referring to FIG. 12F, when the first station 104a and the second station 104b transmits RTS frame to the AP 102 at the same time interval, the first station 104a and the second station 104b detect the collision and back off transmission of RTS frame to the AP 102 after detecting the collision. In an embodiment, the first station 104a and the second station 104b detect the collision and are backed off early even before the collision. Thus, savings in terms of power can be achieved and the data transmission is restarted by the first station 104a and the second station 104b.

Figure 12G:
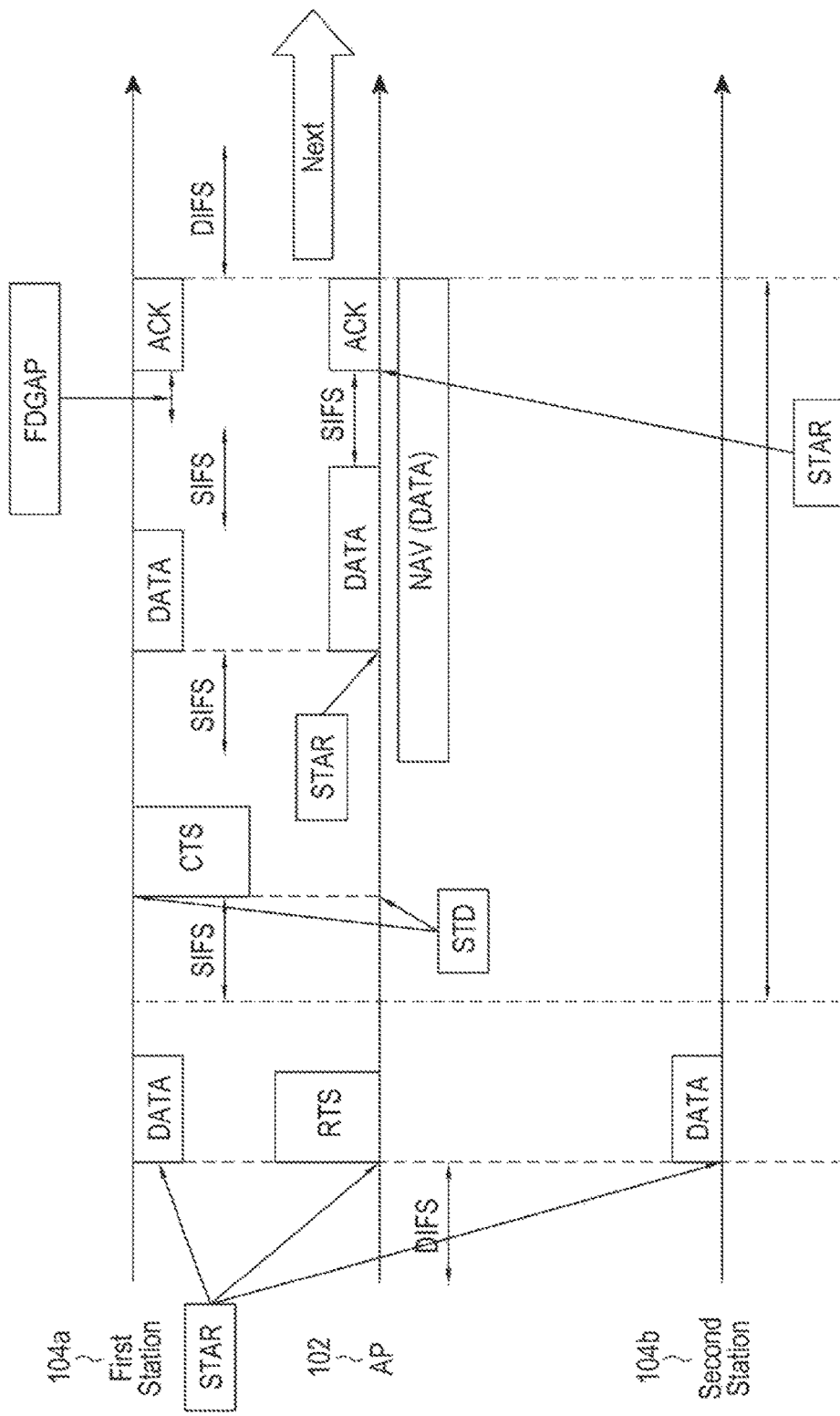

FIG. 12G illustrates decoding schemes such as STAR and standard are implemented at the station and the AP, according to an exemplary embodiment of the present disclosure.

Referring to FIG. 12G, the AP 102, the first station 104a and the second station 104b) use STAR while transmitting RTS and DATA. Further, the station 104 uses standard decoding (without STAR) while the AP 102 is receiving the CTS frame from the station 104 or the station 104 is transmitting the CTS frame to the AP 102. It may be noted that the AP switches from the STAR mode to the standard decoding and power consumption is reduced with the effect of switching from STAR mode to standard decoding.

When the first station 104a or the second station 104b is transmitting DATA or ACK to the AP 102, the first station 104a or the second station 104b uses STAR to transmit DATA or ACK, else the station 104 uses standard procedure when there is no DATA to transmit to the AP 102. Thus, the station 104 uses standard procedure instead of STAR to achieve significant power savings when there is no DATA to transmit to the AP 102.

While receiving the DATA or ACK from the first station 104a or the second station 104b, the AP 102 uses STAR to receive DATA or ACK as shown in the FIG. 12G.

Figure 13A:
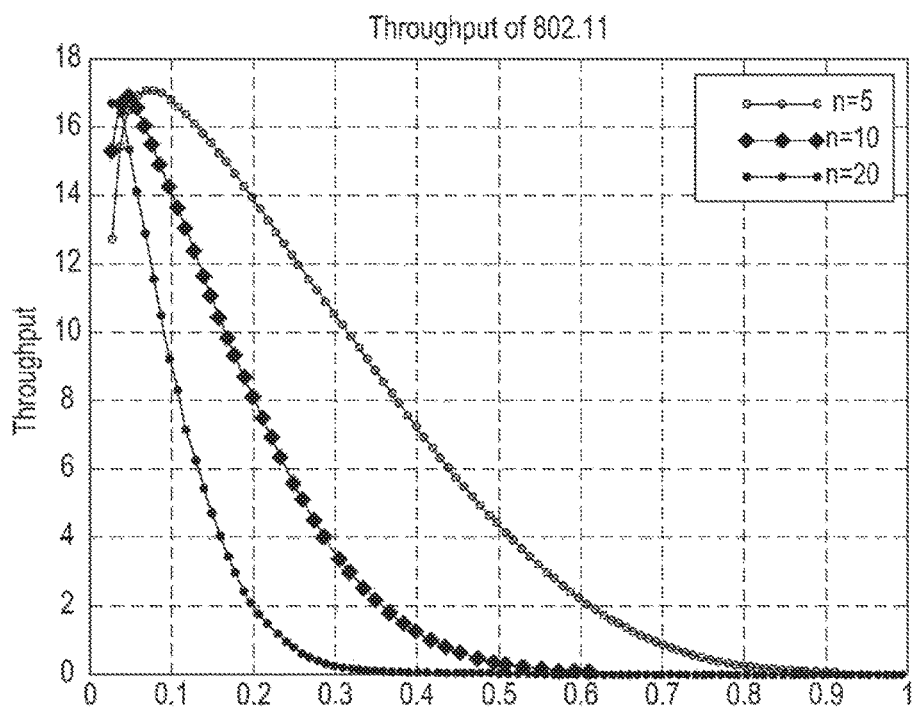
FIGS. 13A and 13B are graphs showing throughput with standard CSMA/CA and with STAR in the WLAN using STAR access protocol in mode R respectively, according to an exemplary embodiment of the present disclosure.
Figure 13B:
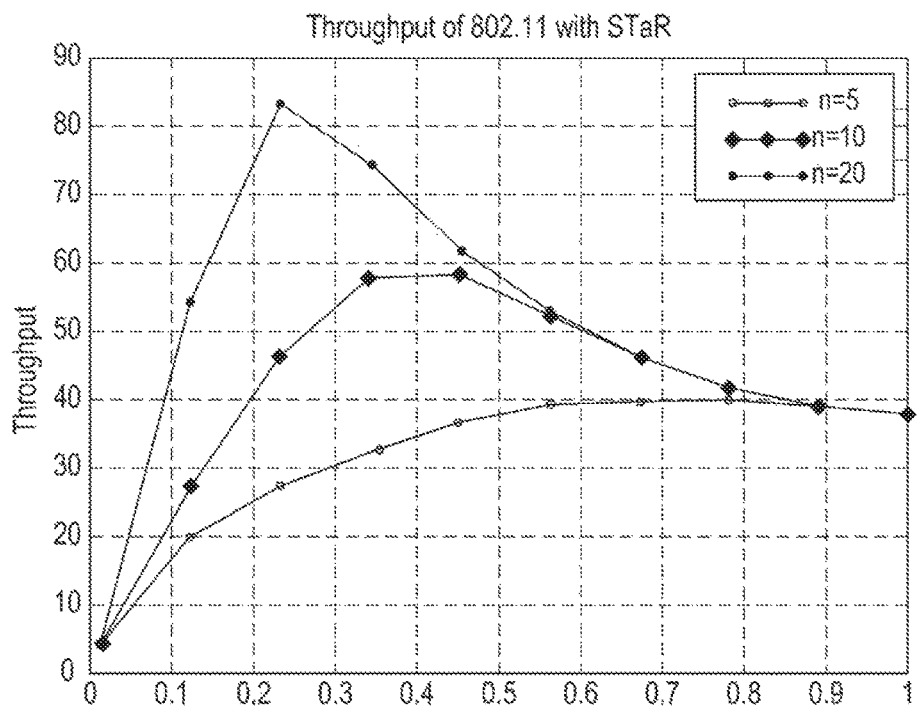

FIGS. 13A and 13B are graphs showing throughput with standard CSMA/CA and with STAR access protocol in mode R respectively, according to an exemplary embodiment of the present disclosure. In order to create example simulation, the IEEE 802.11n system with a data rate of 54 Mbps, MAC payload of 8148 bits and other standard parameters are considered.

Referring to FIG. 13A, it can be inferred that the saturation throughput of the standard CSMA/CA is approximately 13.5 Mbps at an attempt probability of approximately 0.5. When the number of nodes (n) increases, the saturation throughput has reached early (the saturation throughput varies from 0.01-0.05 for the nodes in range of 5-20).

Referring to FIG. 13B, it can be inferred that the saturation throughput for the proposed STAR access protocol in mixed mode reaches to 58 Mbps for n equals to 10. Further, the saturation output reaches to 80 Mbps for n equals to 20. It may be noted that the throughput has improved over three times which indicates a drastic capacity improvement in the throughput. Furthermore, it can also be observed that the attempt probability for saturation throughput has increased by three times which corroborate the capacity enhancement.

The simulation shown in the FIGS. 13A and 13B are only for illustrative purpose and does not limit the scope of the invention. It is to be understood that other embodiments are not limited thereon.

Figure 14:
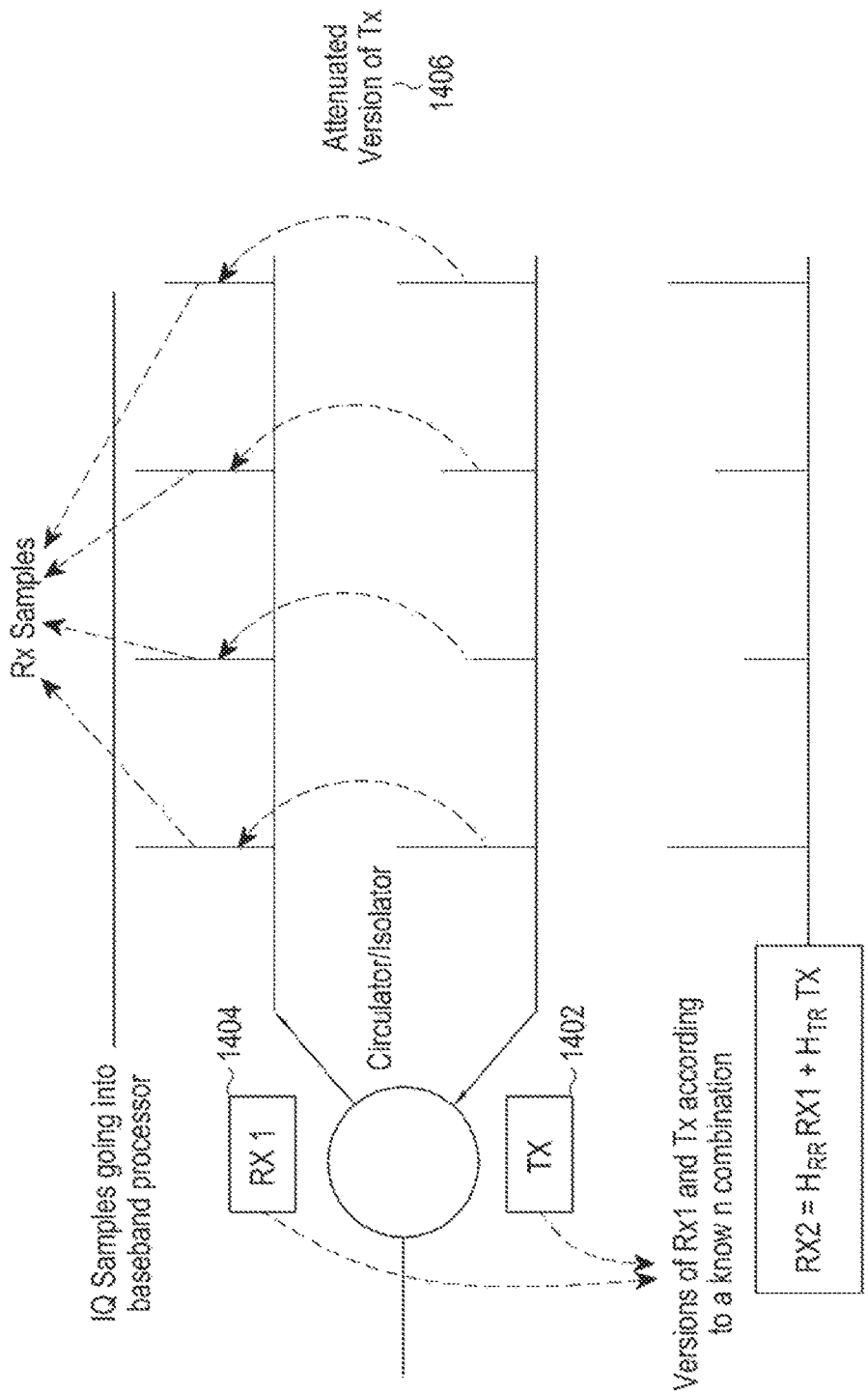
FIG. 14 illustrates a transceiver that supports receive diversity in STAR, according to an exemplary embodiment of the present disclosure.

FIG. 14 illustrates a transceiver that supports receive diversity in STAR, according to an exemplary embodiment of the present disclosure. In order to mitigate the effects of fading, radio communication receivers typically employ diversity techniques to enhance the Signal-to-Noise Ratio (SNR) of the signal in a fading environment. Standard diversity techniques attempt to obtain multiple, decorrelated replicas of the transmitted signal. For example, by using multiple antennas typically spaced several wavelengths apart or by receiving redundant transmissions at predetermined time intervals. Thus, by receiving multiple copies of the transmitted signal, the diversity receiver produces an output signal with a better overall signal-to-noise ratio than if only one copy of the transmitted signal is received.

In general, a system implementing STAR requires three Radio Frequency (RF) chains to perform one transmission and two receptions in parallel. A receive diversity gain is provided in such a way that the transmitted chain is cancelled form both receive chains. The receiver is enabled with STAR. As depicted in the FIG. 14, signals at the transmitter (Tx) (1402) and the receiver (Rx1) (1404) are similar or it may be understood that the signals at the Rx are attenuated version of Tx (1406), thereby achieving receive diversity.

Figure 15:
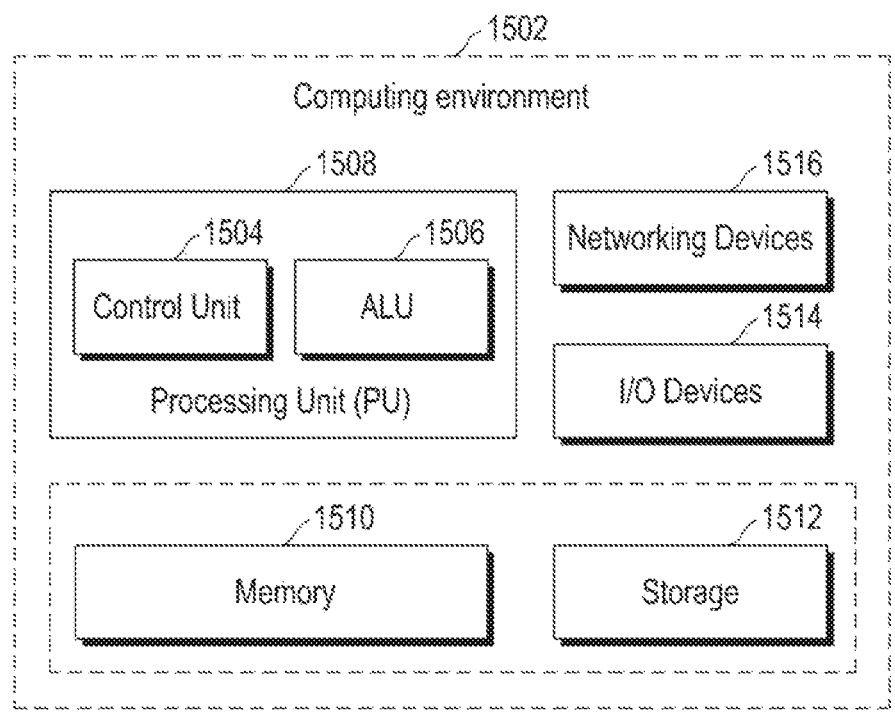
FIG. 15 illustrates a computing environment implementing the method for optimizing channel access in the WLAN, according to an exemplary embodiment of the present disclosure.

FIG. 15 illustrates a computing environment implementing the method for optimizing channel access in the WLAN, according to an exemplary embodiment of the present disclosure.

Referring to FIG. 15, the computing environment 1502 comprises at least one processing unit 1508 that is equipped with a control unit 1504 and an arithmetic logic unit (ALU) 1506, a memory 1510, a storage unit 1512, plurality of networking devices 1516 and a plurality Input output (I/O) devices 1514. The processing unit 1504 is responsible for processing the instructions of the schemes. The processing unit 1508 receives commands from the control unit in order to perform its processing. Further, any logical and arithmetic operations involved in the execution of the instructions are computed with the help of the ALU 1506.

The overall computing environment 1502 can be composed of multiple homogeneous and/or heterogeneous cores, multiple CPUs of different kinds, special media and other accelerators. The processing unit 1508 is responsible for processing the instructions of the schemes. Further, the plurality of processing units 1508 may be located on a single chip or over multiple chips.

The schemes comprising of instructions and codes required for the implementation are stored in either the memory unit 1510 or the storage 1512 or both. At the time of execution, the instructions may be fetched from the corresponding memory 1510 or storage 1512, and executed by the processing unit 1508.

In case of any hardware implementations various networking devices 1516 or external I/O devices 1514 may be connected to the computing environment to support the implementation through the networking unit and the I/O device unit.

The present disclosure disclosed herein can be implemented through at least one software program running on at least one hardware device and performing network management functions to control the elements. The elements shown in the FIGS. 1 through 15 include blocks which can be at least one of a hardware device, or a combination of hardware device and software module.

The foregoing description of the specific embodiments will so fully reveal the general nature of the present disclosure herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for optimizing channel access by a station in a wireless local area network, the method comprising:
   receiving first information from an access point (AP); and
   transmitting second information to the AP while receiving the first information from the AP,
   wherein the first information and the second information include at least one of a request to send (RTS) frame, a clear to send (CTS) frame, acknowledgement information, or data.

2. The method of claim 1, wherein the station operates in a simultaneous transmission and reception (STAR) mode.

3. The method of claim 2, wherein the station receives the RTS frame from the AP while transmitting the acknowledgement information in the STAR mode.

4. The method of claim 1, further comprising:
   transmitting the RTS frame including a preamble and payload data to the AP when the AP is in communication with another station; and
   detecting a collision of the RTS frame when the preamble of the RTS frame is transmitted.

5. The method of claim 4, further comprising:
   performing backing off transmission of the payload data in the RTS frame;
   determining whether the communication between the AP and the other station is successful; and
   aggressively transmitting the RTS frame if it is determined that the communication is successful.

6. The method of claim 5, wherein the station aggressively transmits the RTS frame to the AP while the AP receives the data from the other station.

7. A station in a wireless local area network, the station comprising:
   a transceiver configured to transmit and receive information; and
   a controller configured to control:
      to receive first information from an access point (AP); and
      to transmit second information to the AP while receiving the first information from the AP,
      wherein the first information and the second information include at least one of a request to send (RTS) frame, a clear to send (CTS) frame, acknowledgement information, or data.

8. The station of claim 7, wherein the controller is configured to operate in a simultaneous transmission and reception (STAR) mode.

9. The station of claim 8, wherein the controller is further configured to control to receive the RTS frame from the AP while transmitting the acknowledgement information in the STAR mode.

10. The station of claim 7, wherein the controller is further configured to control:
   to transmit the RTS frame including a preamble and payload data to the AP when the AP is in communication with another station, and
   to detect collision of the RTS frame when the preamble of the RTS frame is transmitted.

11. The station of claim 10, wherein the controller is further configured to control:
   to back off transmission of the payload data in the RTS frame;
   to determine whether the communication between the AP and the other station is successful; and
   to aggressively transmit the RTS frame if it is determined that the communication is successful.

12. The station of claim 11, wherein the controller is further configured to control to aggressively transmit the RTS frame to the AP while the AP receives the data from the other station.

* * * * *